(12) United States Patent
Moser

(10) Patent No.: US 7,656,652 B2
(45) Date of Patent: Feb. 2, 2010

(54) PORTABLE COMPUTER WITH RECONFIGURABLE DISPLAY

(76) Inventor: George Moser, 7685 Athlone Dr., Brighton, MI (US) 48116

( * ) Notice: Subject to any disclaimer, the term of this patent is extended or adjusted under 35 U.S.C. 154(b) by 186 days.

(21) Appl. No.: 11/988,268

(22) PCT Filed: Jun. 29, 2006

(86) PCT No.: PCT/US2006/025399

§ 371 (c)(1),
(2), (4) Date: Jan. 4, 2008

(87) PCT Pub. No.: WO2007/055750

PCT Pub. Date: May 18, 2007

(65) Prior Publication Data

US 2009/0141439 A1    Jun. 4, 2009

Related U.S. Application Data

(60) Provisional application No. 60/734,652, filed on Nov. 9, 2005, provisional application No. 60/734,704, filed on Nov. 9, 2005.

(51) Int. Cl.
*G06F 1/16* (2006.01)
(52) U.S. Cl. .................. 361/679.27; 345/107; 206/457; 455/558; 248/551; 40/313
(58) Field of Classification Search .................. 345/3.1, 345/107, 5, 156; 361/679.27, 679.29, 679.55, 361/679.06, 670.22; 206/8.3, 6.1, 457, 581; 455/561, 558, 418; 248/551, 323, 442.2, 248/121; 40/453, 605, 313
See application file for complete search history.

(56) References Cited

U.S. PATENT DOCUMENTS

| | | | |
|---|---|---|---|
| 5,253,139 A | 10/1993 | Satou | |
| 5,548,477 A | 8/1996 | Kumar et al. | |
| 5,670,969 A * | 9/1997 | Yamagami et al. | ........... 345/3.1 |
| 5,708,561 A | 1/1998 | Huilgol et al. | |
| 5,724,704 A | 3/1998 | Seo | |
| 5,793,606 A | 8/1998 | Cubbage et al. | |
| 5,796,576 A | 8/1998 | Kim | |
| 5,805,415 A | 9/1998 | Tran et al. | |
| 6,006,243 A | 12/1999 | Karidis | |
| 6,137,468 A | 10/2000 | Martinez et al. | |
| 6,189,850 B1 | 2/2001 | Liao et al. | |
| 6,233,138 B1 | 5/2001 | Osgood | |
| 6,411,282 B1 | 6/2002 | Ishizawa et al. | |
| 6,441,828 B1 | 8/2002 | Oba et al. | |
| 6,445,385 B1 | 9/2002 | Shin et al. | |
| 6,504,707 B2 | 1/2003 | Agata et al. | |
| 6,512,670 B1 | 1/2003 | Boehme et al. | |
| 6,519,143 B1 | 2/2003 | Goko | |
| 6,522,529 B1 | 2/2003 | Huilgol et al. | |

(Continued)

*Primary Examiner*—Hung V Duong
(74) *Attorney, Agent, or Firm*—Brad R. Bertoglio

(57) ABSTRACT

A portable computer system is provided having a base unit and a detachable display unit. The display unit can be attached to and supported by the base unit in a landscape orientation or a portrait orientation via one or more connectors provided on two different sides of the display unit. The base unit may include support pins providing physical support to the display unit. Alternatively, the base unit may include a support arm which attaches to and slides within a slot extending along two sides of the display unit, such that the display unit can be moved between landscape and portrait orientations.

20 Claims, 26 Drawing Sheets

U.S. PATENT DOCUMENTS

| | | |
|---|---|---|
| 6,590,547 B2 | 7/2003 | Moriconi et al. |
| D486,823 S | 2/2004 | Kuo |
| D491,933 S | 6/2004 | Guo |
| 6,778,382 B2 | 8/2004 | Yim |
| 6,813,143 B2 | 11/2004 | Mäkelä |
| 6,873,521 B2 | 3/2005 | Landry et al. |
| 6,952,340 B2 | 10/2005 | Son et al. |
| 6,954,352 B2 * | 10/2005 | Kuo ................ 361/679.27 |
| 6,989,987 B1 | 1/2006 | Wilson et al. |
| 7,016,182 B2 | 3/2006 | Brandenberg et al. |
| 7,025,274 B2 | 4/2006 | Solomon et al. |
| D521,992 S | 5/2006 | Morooka et al. |
| 7,046,233 B2 | 5/2006 | Yano et al. |
| 7,054,145 B2 | 5/2006 | Tanaka et al. |
| 7,063,424 B1 | 6/2006 | Brinkman |
| 2003/0103324 A1 | 6/2003 | Gallivan |
| 2004/0190234 A1* | 9/2004 | Lin et al. ................ 361/681 |
| 2005/0057893 A1 | 3/2005 | Homer et al. |
| 2006/0067036 A1* | 3/2006 | Lin et al. ................ 361/681 |

* cited by examiner

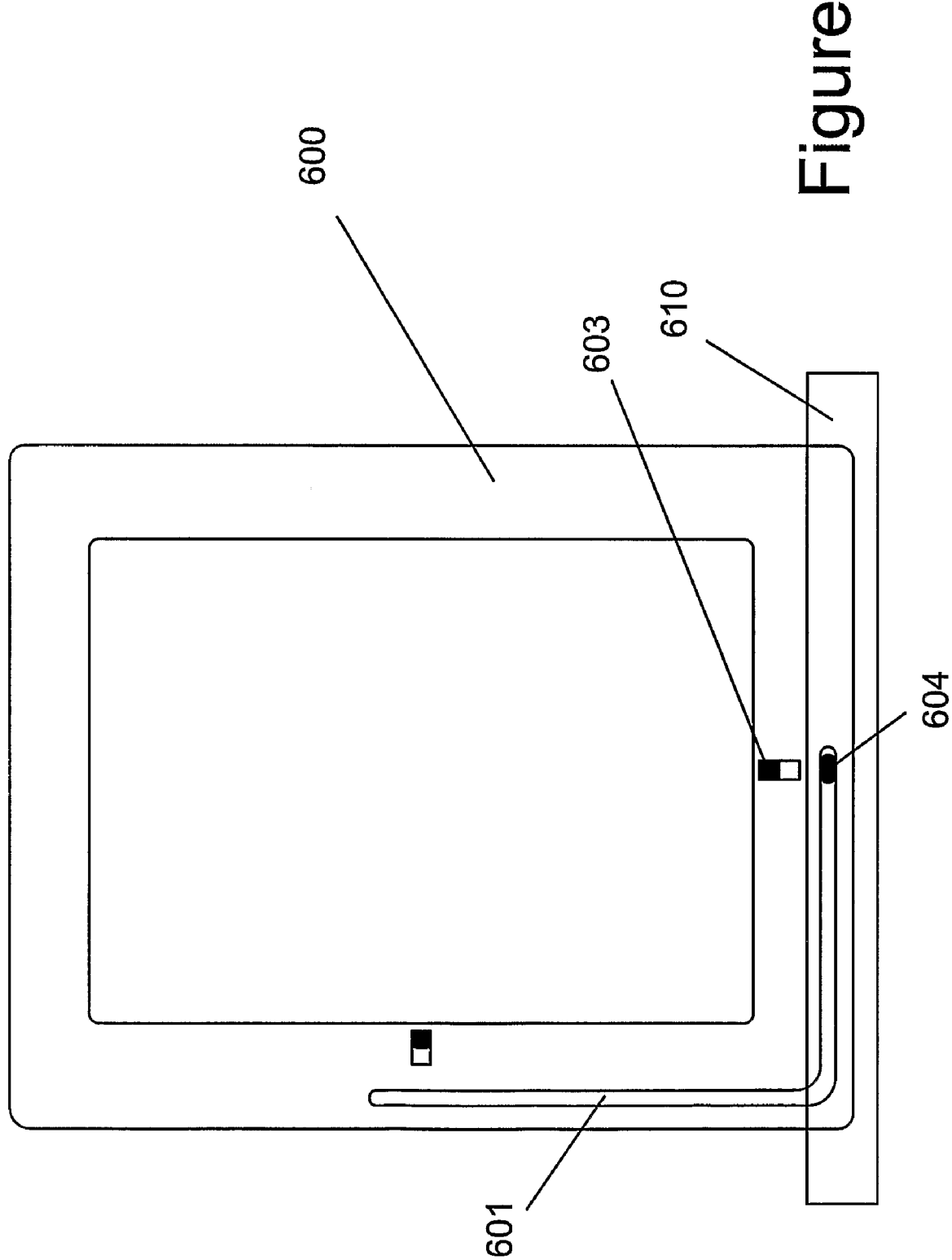

PORTABLE COMPUTER WITH RECONFIGURABLE DISPLAY

BACKGROUND OF THE INVENTION

The present invention relates in general to the computer field, and in particular, to a computer providing viewing flexibility and adaptability to user needs.

Current portable computers are often designed using a clamshell configuration, which includes a base portion with a computer keyboard, connected at one edge to a display portion via a hinge mechanism. While the user is able to tilt the angle of the display, the display is otherwise fixed in relationship to the base unit.

The display portion of such clamshell portable computers typically has a fixed aspect ratio, in which the width of the display is greater than its height. Many conventional displays employ a 4:3 aspect ratio. Other displays provide various "widescreen" aspect ratios, such as 16:9. Such aspect ratios, having width greater than height, are sometimes referred to as "landscape" configurations.

While landscape display configurations may be efficient for some applications, there are other applications for which it may be desirable to employ a display configuration having a height greater than its width, i.e., a "portrait" display configuration. However, since many portable computers have a display with a fixed orientation, users may be forced to use a landscape display orientation, even for applications in which a portrait configuration would be more effective. For example, many of the standard papers sizes for printed documents have heights greater than their widths. For users creating or reviewing documents formatted for printing on such papers, a portrait display configuration may provide more efficient use of the display area. Therefore, in some circumstances, it may be desirable to provide a portable computer having a portrait display configuration, while other circumstances may call for a landscape display orientation. It may also be desirable to enable a user to select between landscape and portrait display configurations based upon the task presently at hand. Thus, in accordance with one aspect of some embodiments of the invention, a portable computer is provided having a display that can be readily changed between landscape and portrait configurations. Such a configurable display may enable a computer to improve a user's satisfaction and productivity in connection with a wide variety of applications.

Because portable computers typically have a fixed display, users are often forced to choose between a small computer which is highly portable but saddled with a small display having limited display area, and a larger computer having greater display area but a correspondingly larger size and reduced portability. Therefore, in some applications it may be desirable to provide a modular portable computer capable of operating with a plurality of different display panels.

Some users rely on Personal Digital Assistants (PDAs) for a portable computing solution. However, many PDAs have limited computing power and storage capacity as compared to laptop or portable computers. Such PDAs often cannot run software that users normally use on their PCs, and small PDA keyboards may require a stylus for input and are cumbersome and difficult to use. PDAs typically use a different operating system as compared to a user's laptop computer, which may be inconvenient and introduce incompatibility issues for many users. Finally, operating a separate PDA and portable computer may require a user to regularly transfer data between the devices. Therefore, it may be desirable to provide a portable computing solution having greater portability than many laptop computers, but greater computing power than typical PDAs.

Some of these and other features may be provided through implementation of various aspects of the present invention.

SUMMARY OF THE INVENTION

In accordance with one aspect of the invention, a portable computer system is provided, which includes a base unit and a detachable display unit. The detachable display unit includes a plurality of connectors, positioned on at least two sides of the display unit, such as two adjacent sides. The base unit includes one or more base connectors capable of engaging the display unit connectors. The base connector(s) and display connectors are typically matched pairs of connector blocks and receptacles. Accordingly, the display unit can be attached to the base unit in either a landscape or a portrait orientation. Moreover, the orientation of the display unit can be readily switched between landscape and portrait orientations by a user.

In some embodiments, either the base connector(s) or the display connectors are tilting connectors, such that the angle of the display can be readily adjusted while it is attached to the base unit. The base connectors may be mounted on a rotating support shaft, or attached to the base unit directly by a rotating mechanism such as frictional hinges.

The joined base and display connectors may provide both physical support for the display unit, as well as electrical interconnection between the base unit and the display unit. One or more of the connectors may include a notch structure that can be engaged by a latch to secure the display unit to the base unit. Additional structures can also be employed to provide physical support for the display unit. For example, the base unit may include support pins that engage corresponding receptacles in the display unit. In some embodiments, such support pins may be individually, rotatably connected to the base. In other embodiments, the support pins may be attached to a rotatable support bar. In yet other embodiments, the support pins may be attached to the display unit, with corresponding receptacles provided in the base unit. One or more latches may also be provided to further secure the base unit with the display unit.

The display unit may include a plurality of electrical conductors to route electrical signals within it. A display panel, such as an LCD, receives video display information from the base unit. The plurality of electrical conductors can route such video signals from connectors located on either of at least two sides of the display unit, thereby conveying video signals to the display panel regardless of whether the display unit is attached to the base unit in, e.g., a landscape or portrait orientation. The electrical conductors may be in a wiring harness.

One or more branches of the display unit electrical conductors can optionally be disconnected from the display panel when not in use, which may be useful in reducing electromagnetic interference within the display unit. For example, one end of a spring-biased slidable finger element may extend from the surface of the display unit near one of the display connectors. When the display unit is attached to the base unit using that display connector, the slidable finger element is depressed via contact with the base unit, thereby closing the conductive pathway between that display connector and the display panel and permitting the transmission of video signals. When the display unit is detached from the base unit, the finger is biased outwards, thereby opening the conductive pathway between the display connector and the display panel, thereby avoiding the conductance of electromagnetic interference thereon. In embodiments having multiple connectors on each of at least two sides of the display unit, data signals and power lines may also be routed through separate connectors to reduce interference between the two.

A cylindrical connector can also provide electrical interconnection between the base unit and display unit. A cylindrical connector bar may be attached to either the base unit or the display unit. The connector bar includes a plurality of electrical contacts extending around the circumference of the connector bar. Mating contacts, such as spring-loaded contacts, can be provided to contact and move along the cylindrical electrical contacts, thereby maintaining an electrical interconnection between the base unit and the display unit as the display unit is tilted to adjust the viewing angle.

In accordance with another aspect of the invention, the base unit may include a connector socket which is attached to the base unit via a ball and socket mechanism, allowing for ready movement of the socket connector relative to the remainder of the base unit. A rotatable interconnection with the display unit can also be provided by attaching the display connectors to rotatable shafts within the display unit. The display unit shafts can include cylindrical electrical contacts around their circumference, with spring-loaded contacts in the display unit contacting and riding along the circumference of the shaft as the display is rotated relative to the display connector.

In accordance with another aspect of the invention, the base unit can be provided with an integrated display panel, as well as a connector for attachment of a detachable display unit. The integrated display panel can provide a user with a display interface when the base unit is used without a detachable display panel. The detachable display panel can be connected to the base unit to provide a greater display area when desired.

In accordance with another aspect of the invention, the display unit may include a slot extending along at least a portion of the length of two adjacent sides of the display unit. A support arm is connected to the base at one end, and engages the display unit slot on the other. The support arm can slide within the slot, such that the display unit can be repositioned relative to the base unit. Electrical contacts can be provided on the support art, and within the display unit slot at two or more positions, to provide electrical interconnection between the base unit and the display unit. Thus, the display unit can be readily moved from, e.g., a landscape orientation to a portrait orientation while remaining attached to the base unit.

These and other aspects of the invention are described further herein, and will be readily apparent to a person of ordinary skill in the art in view of the present disclosure.

BRIEF DESCRIPTION OF THE DRAWINGS

FIG. 33 is a front elevation of the computer of FIG. 32, having the displayed oriented in a portrait configuration.

DETAILED DESCRIPTION OF THE DRAWINGS

Figure 1:
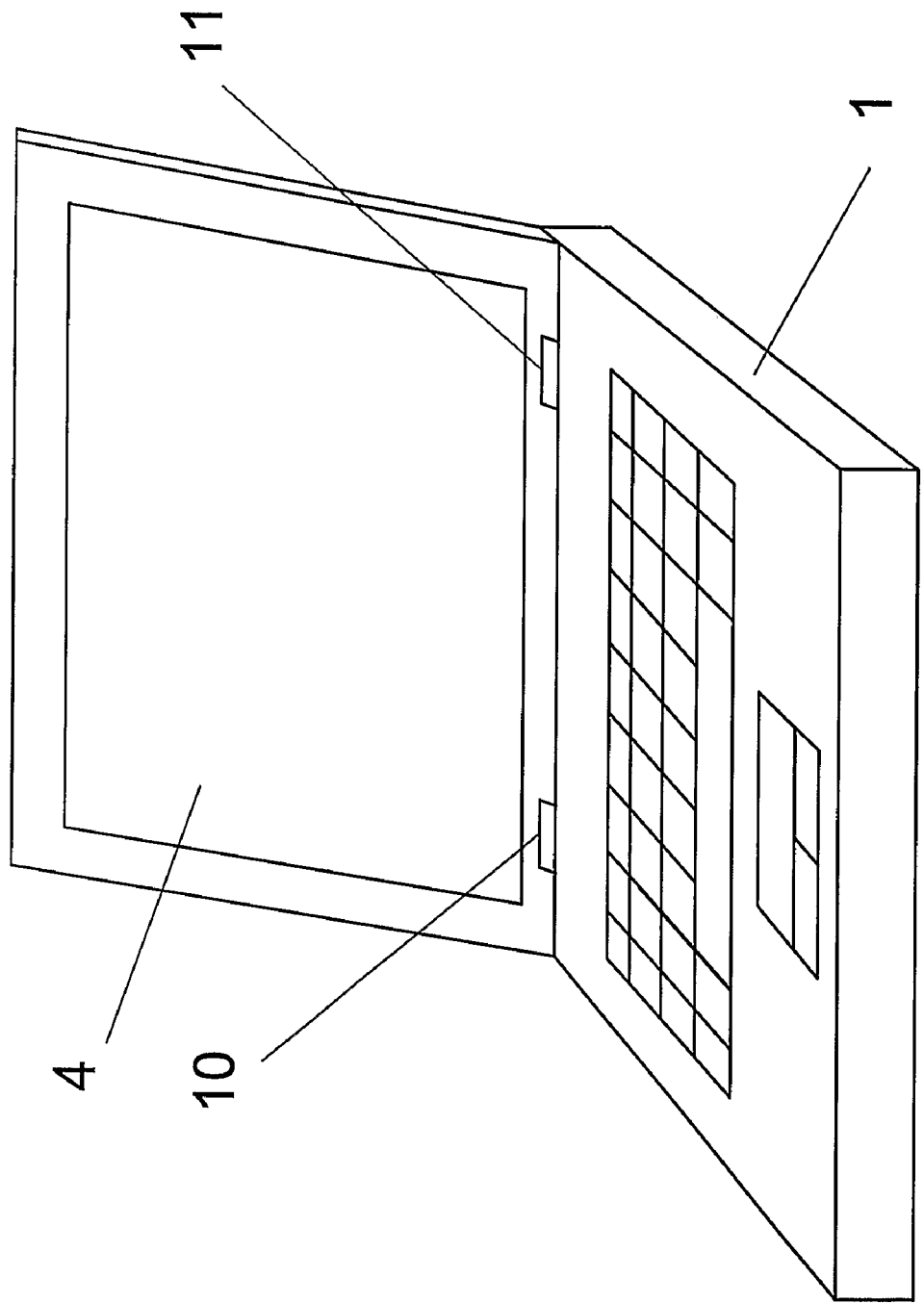
FIG. 1 is a perspective view of a prior art portable computer

While this invention is susceptible to embodiment in many different forms, there are shown in the drawings and will be described in detail herein several specific embodiments, with the understanding that the present disclosure is to be considered as an exemplification of the principles of the invention and is not intended to limit the invention to the embodiments illustrated.

FIG. 1 shows a portable computer having a conventional, prior art configuration. The portable computer of FIG. 1 includes base portion 1 and LCD display portion 4. LCD display 4 provides a landscape display orientation, in which the width of the display is greater than its height. LCD display 4 is attached to base portion 1 via friction hinges 10 and 11. Hinges 10 and 11 allow the user to adjust the angle of display 4 relative to base portion 1, and further permit display 4 to be folded flat against the top surface of base portion 1, for convenient storage and transportation. However, the aspect ratio of display 4 is fixed, in a landscape orientation.

Figure 2:
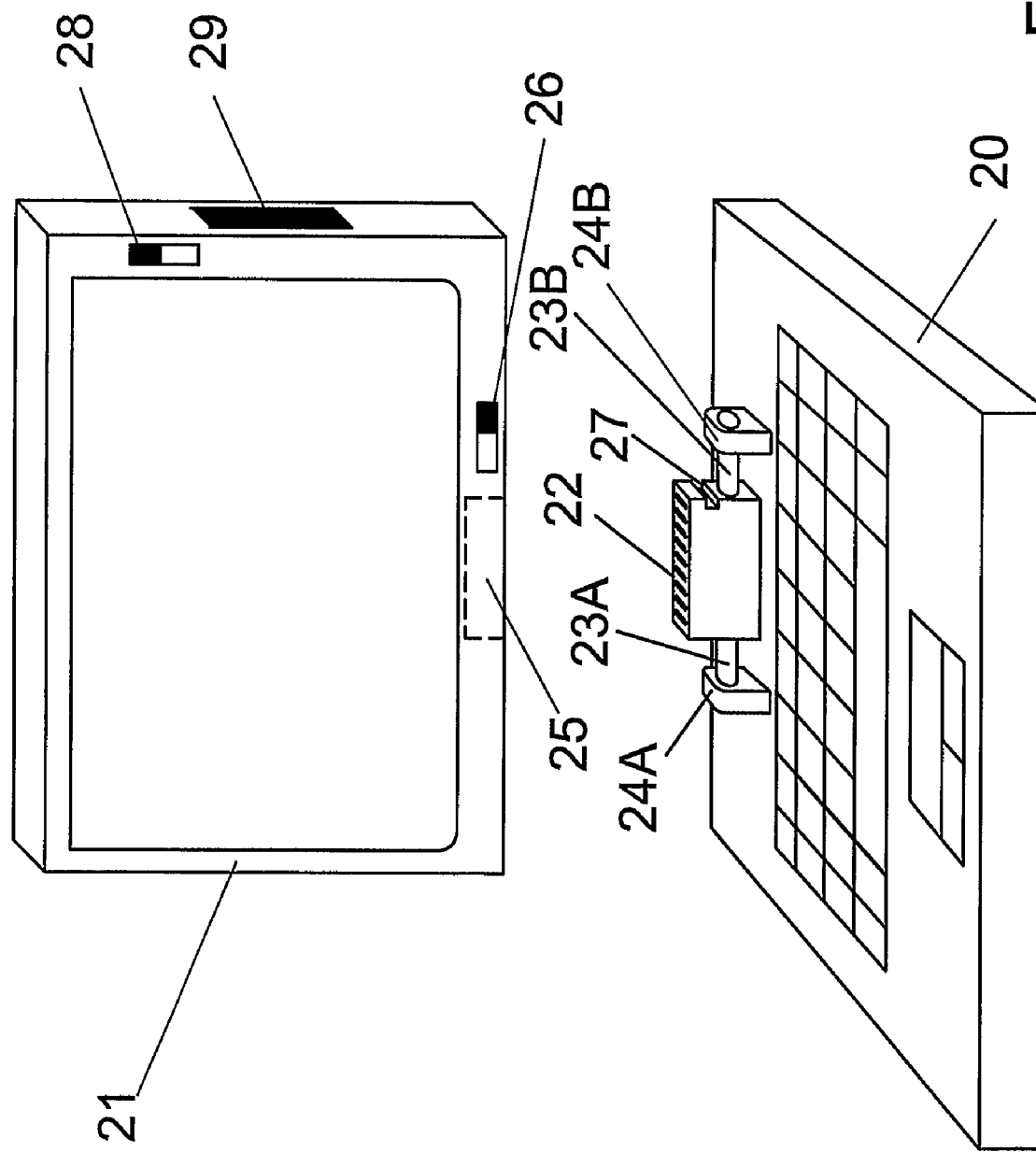
FIG. 2 is a perspective view of a portable computer having a detached display panel, in accordance with one embodiment of the present invention.

FIG. 2 illustrates a portable computer configured using a modular approach, in which the user can reconfigure the portable computer by detaching a display portion from a base portion. The same display unit can then be re-attached in a different position, such as at an orientation rotated 90 degrees from the prior position. Alternatively, a second display unit, having differing size, aspect ratio or other characteristics, can be attached to the base unit. The computer can thus be readily reconfigured for different tasks, applications or users.

The portable computer of FIG. 2 includes base portion 20 and display unit 21. Display unit 21 includes an LCD screen. Unlike the prior art LCD display provided by the computer of FIG. 1, display unit 21 can be removably attached to, and detached from, base portion 20. Specifically, base portion 20 includes tiltable connector 22. Connector 22 includes axles 23A and 23B, which engage friction hinges 24A and 24B, respectively. Friction hinges 24 are attached to base portion 20, and permit the rotation of connector 22 around the axis defined by axles 23.

Figure 8:
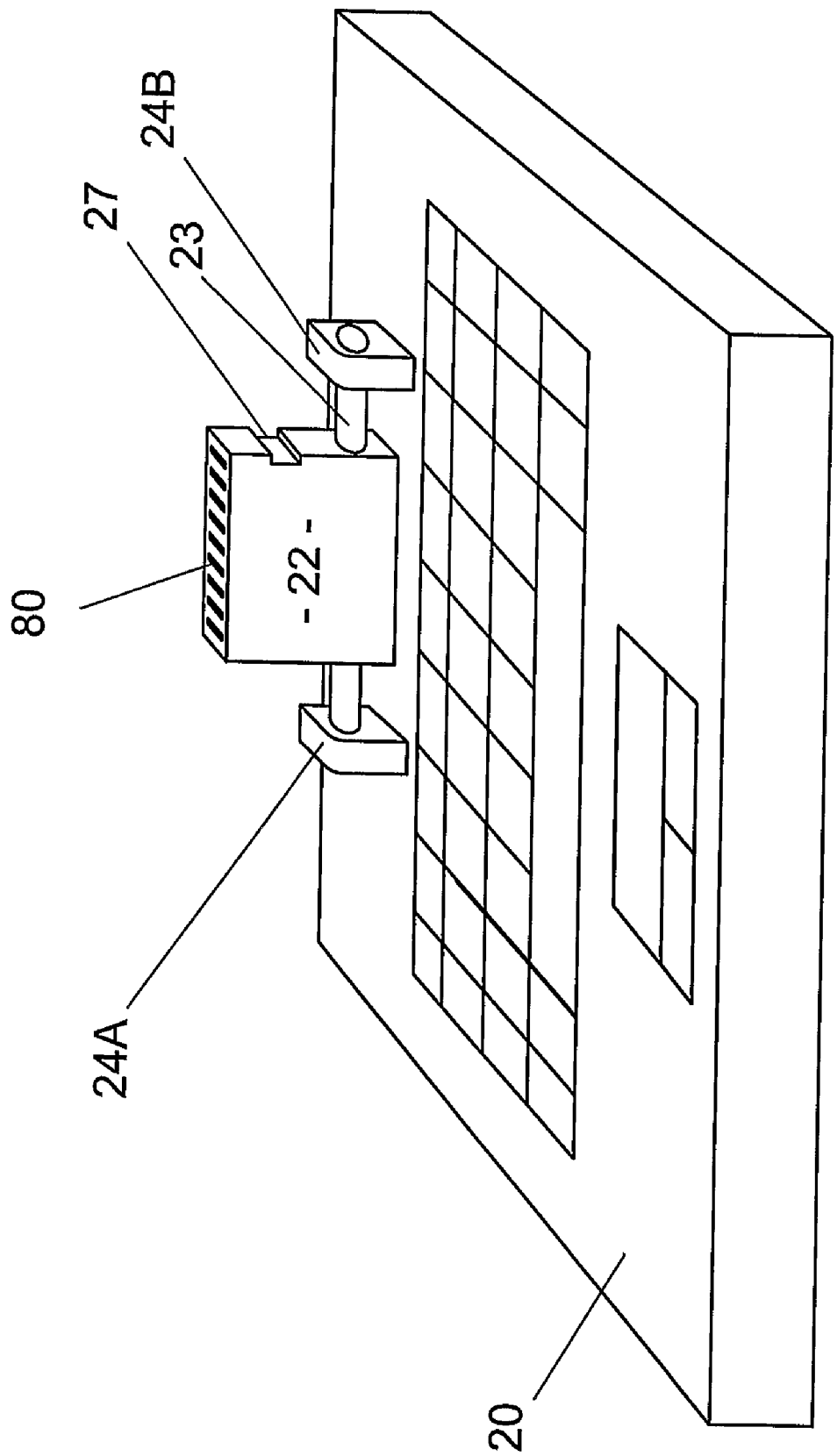
FIG. 8 is a perspective view of the base unit portion of the portable computers illustrated in FIGS. 2-7.

FIG. 8 provides an expanded view of base unit 20 and connector 22. Connector 22 is rotatably supported by friction hinges 24A and 24B, allowing the user to adjust the viewing angle of an attached display. In this particular embodiment, connector 22 has a rectangular cross-section that mates with the rectangular cross-section of a corresponding cavity in the display unit, to physically anchor the display unit into the base. Connector 22 includes retention slot 27, which can be used to engage a display unit latch to securely lock the display unit to the base unit in the chosen orientation. Connector 22 is equipped with a set of electrical contacts 80 that mate with corresponding contacts in the display unit, towards providing power, data and video signals from computer base unit 20 to the display unit. While a variety of connector and electrical contact schemes can be employed, electrical contacts 80 are preferably spring-loaded contacts, which can be plugged and unplugged easily, withstand a high number of cycles and provide a quick and reliable means of interconnection.

As illustrated in FIG. 2, display unit 21 includes a first receptacle 25, into which connector 22 can be removably inserted to engage display unit 21 with base unit 20 in a landscape orientation. Because connector 22 is rotatable, a user is able to adjust the angle of display unit 21 relative to base unit 20 while the computer is in use. The electrical contacts of connector 22 mate with electrical contacts in receptacle 25, to transfer electrical power, data and video signals from base unit 20 to display unit 21.

In addition to providing a means of electrical interconnection, the engagement of connector 22 into receptacle 25 also provides mechanical support for display unit 21. In order to further secure display unit 21 to base portion 20 while in use, sliding latch 26 can be moved towards receptacle 25 while mated with connector 22, whereby latch mechanism 26 mechanically engages retention slot 27, thereby securely locking display unit 21 onto tilting connector 22.

Figure 3:
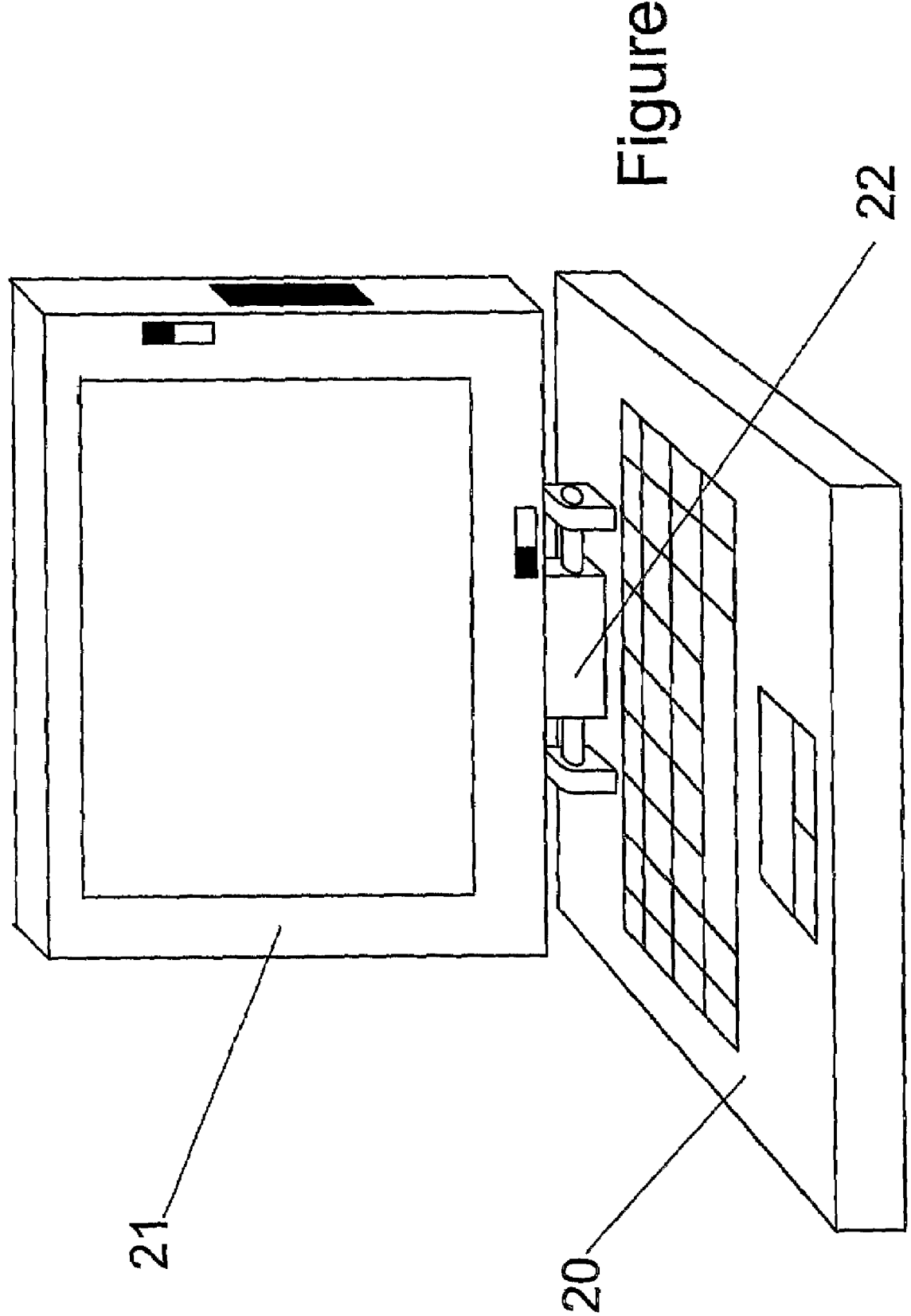
FIG. 3 is a perspective view of the portable computer of FIG. 2, in which the display panel is engaged in a landscape orientation.
Figure 4:
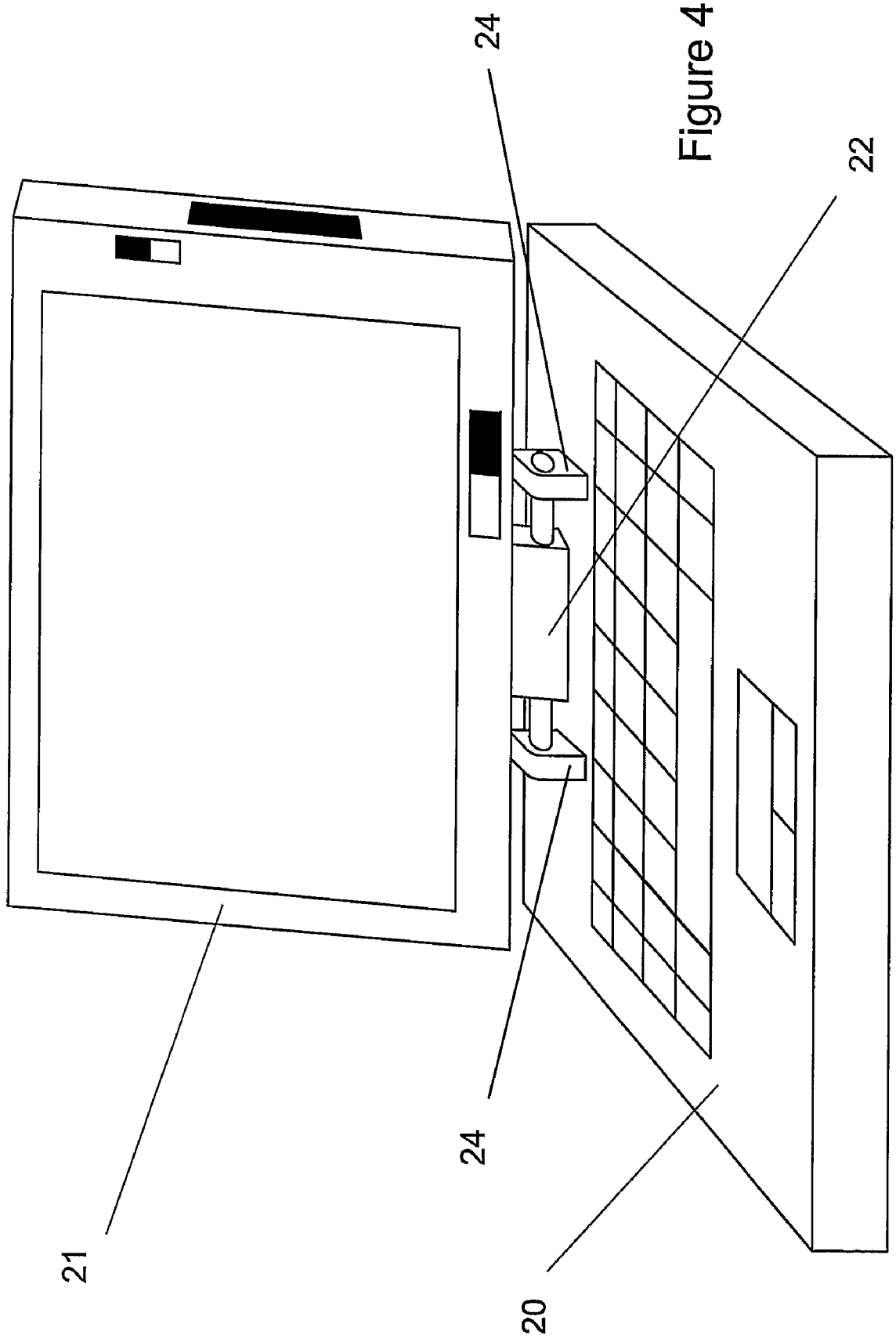
FIG. 4 is a perspective view of the portable computer of FIG. 3, having the display panel adjusted at an alternative viewing angle.

FIG. 3 illustrates the portable computer system of FIG. 2, where display unit 21 has been connected to base unit 20 by engaging connector 22 into receptacle 25, thereby providing a landscape display orientation. FIG. 4 shows a further configuration in which display unit 21 has been tilted relative to base unit 20 to adjust the display viewing angle, by using hinges 24 to rotate connector 22.

Figure 5:
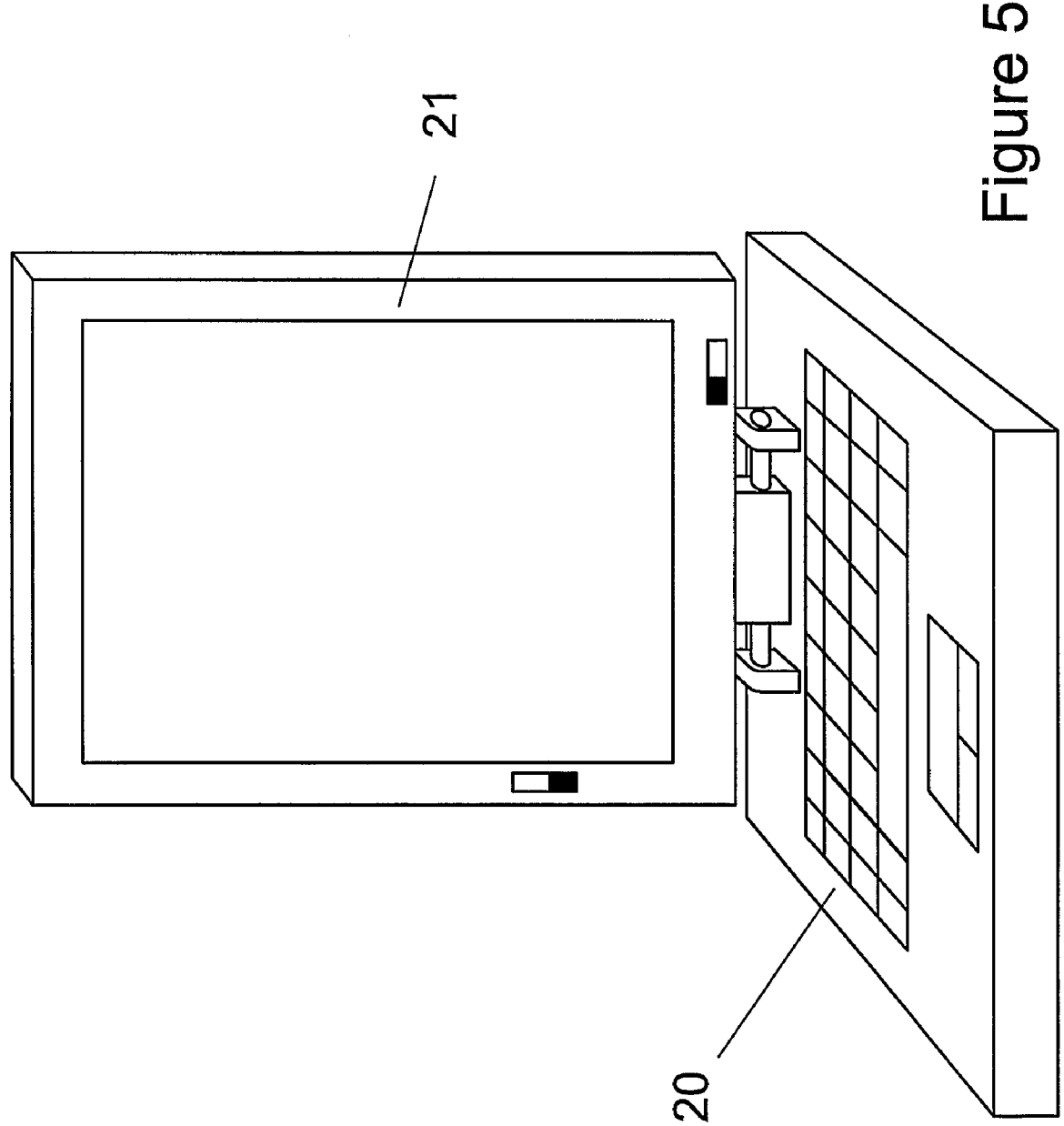
FIG. 5 is a perspective view of the portable computer of FIG. 2, in which the display panel is engaged in a portrait orientation.

Display unit 21 further includes a second receptacle 29 (FIG. 2), positioned on a side of display unit 21 that is adjacent to the side on which receptacle 25 is positioned. Display unit 21 can alternatively be engaged with connector 22 by inserting connector 22 into second receptacle 29, to provide a portrait display orientation. Latch mechanism 28 operates analogously to latch mechanism 26, to provide a further means of mechanically engaging display unit 21 with connector 22, when operated with a portrait display orientation. FIG. 5 shows display unit 21 connected to base unit 20 via the second receptacle, to provide a portrait display orientation. As with the landscape orientation, display unit 21 can be tilted to adjust the viewing angle of the display.

Second receptacle 29 includes an alternative set of electrical contacts capable of removable interconnection with the contacts of connector 22, through which power and signaling can be conveyed from base portion 20 to display unit 21. Amongst the information conveyed between display unit 21 and base portion 20 may be an indication of the orientation of the display unit, such as an indication of which of receptacles 25 or 29 is engaged with connector 22. This information can then be used by computer base portion 20 to automatically reformat the display information sent to display unit 21, for optimal presentation with the current display aspect ratio. For example, if the computer of FIG. 2 is used for a word processing application with connector 22 engaged into receptacle 25 (i.e. a landscape display orientation), a user may wish to reconfigure the computer to have a portrait display orientation. After disconnecting display unit 21 from base unit 20, display unit 21 can be reattached to base unit 20 in a portrait orientation by engaging connector 22 with receptacle 29. By detecting the changed display orientation, base unit 20 can automatically reformat its display data such that it presents image information sized for a portrait aspect ratio. Thus, the user can continue working on the computer seamlessly.

The ability to select a desired landscape and portrait display orientation may provide significant efficiency and/or user satisfaction benefits for some applications. Furthermore, by enabling a user to readily switch between landscape and portrait displays, the computer can be used to optimally display information for a wide variety of different applications.

By enabling a user to readily switch between landscape and portrait screen orientations, the user may be able to achieve greater and more efficient utilization of the screen area provided by any given display. Accordingly, the user may be able to operate using a smaller display screen than would otherwise be required. By enabling the use of a smaller display screen, the present design can provide increased portability and reduced cost.

By implementing a modular portable computer configuration, having separable base and display units, a single base unit can optionally be used with a plurality of different display units. For example, it may be desirable to provide a small, thin, lightweight display unit for increased portability while traveling. Meanwhile, a larger display panel can be attached to provide increased display area at fixed locations such as a user's home or office. Alternatively, for users who regularly travel between two locations such as their home and office, separate display panels can be stored at each location, such that the user need only transport the base unit.

Figure 6:
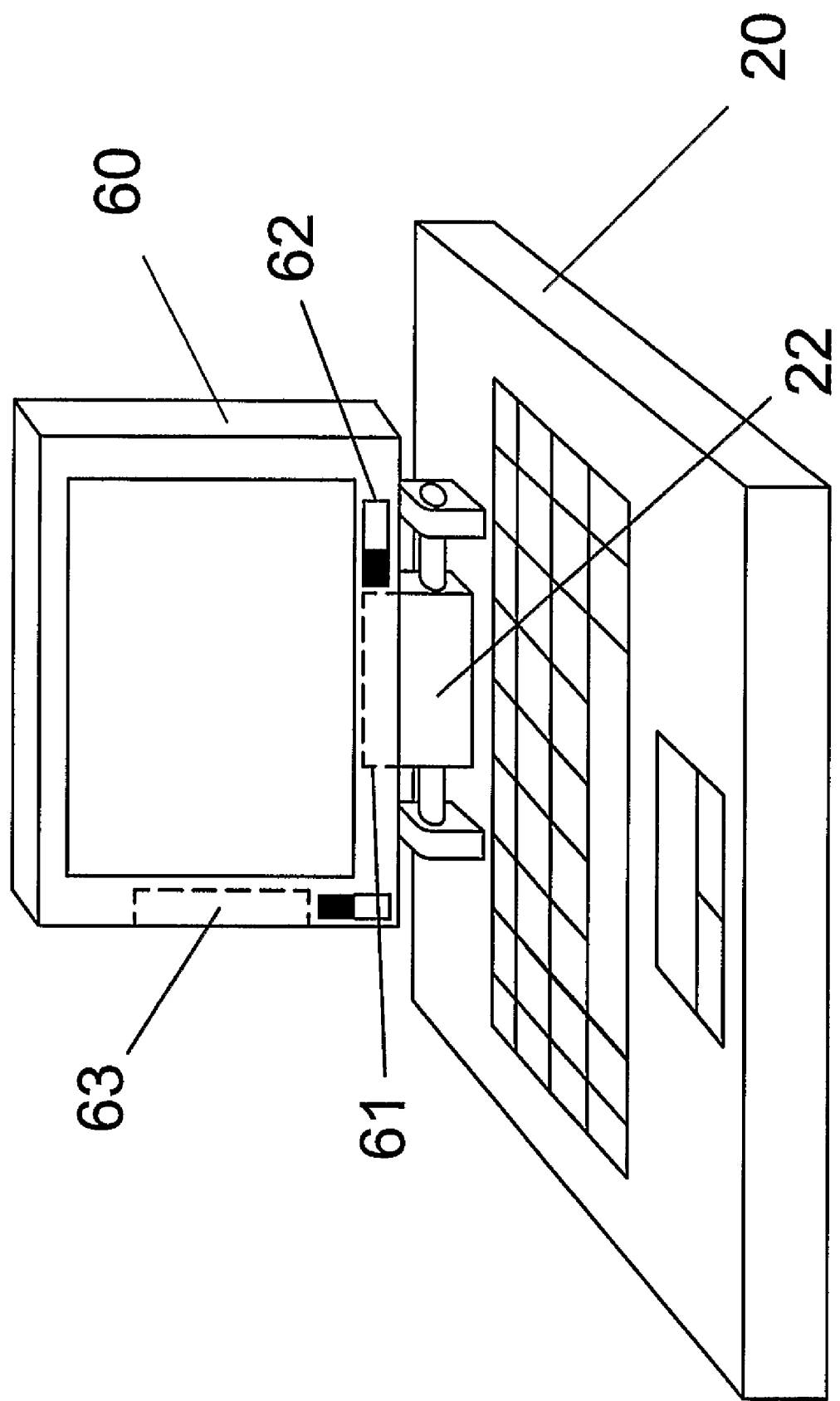
FIG. 6 is a perspective view of a portable computer, employing an alternate display panel having reduced size.

FIG. 6 illustrates a portable computer in which a small, lightweight and highly portable display is provided. Small display unit 60 includes receptacle 61 and latch 62 for removable attachment to connector 22 and base unit 20. As with display unit 21 described above, display unit 60 may also include second receptacle 63 for alternative attachment to base unit 20 in a portrait orientation. Small display unit 60 may provide reduced size and increased portability for applications such as travel use, while still enabling use of the computer and providing an effective screen area for many mobile applications, such as checking email.

Figure 7:
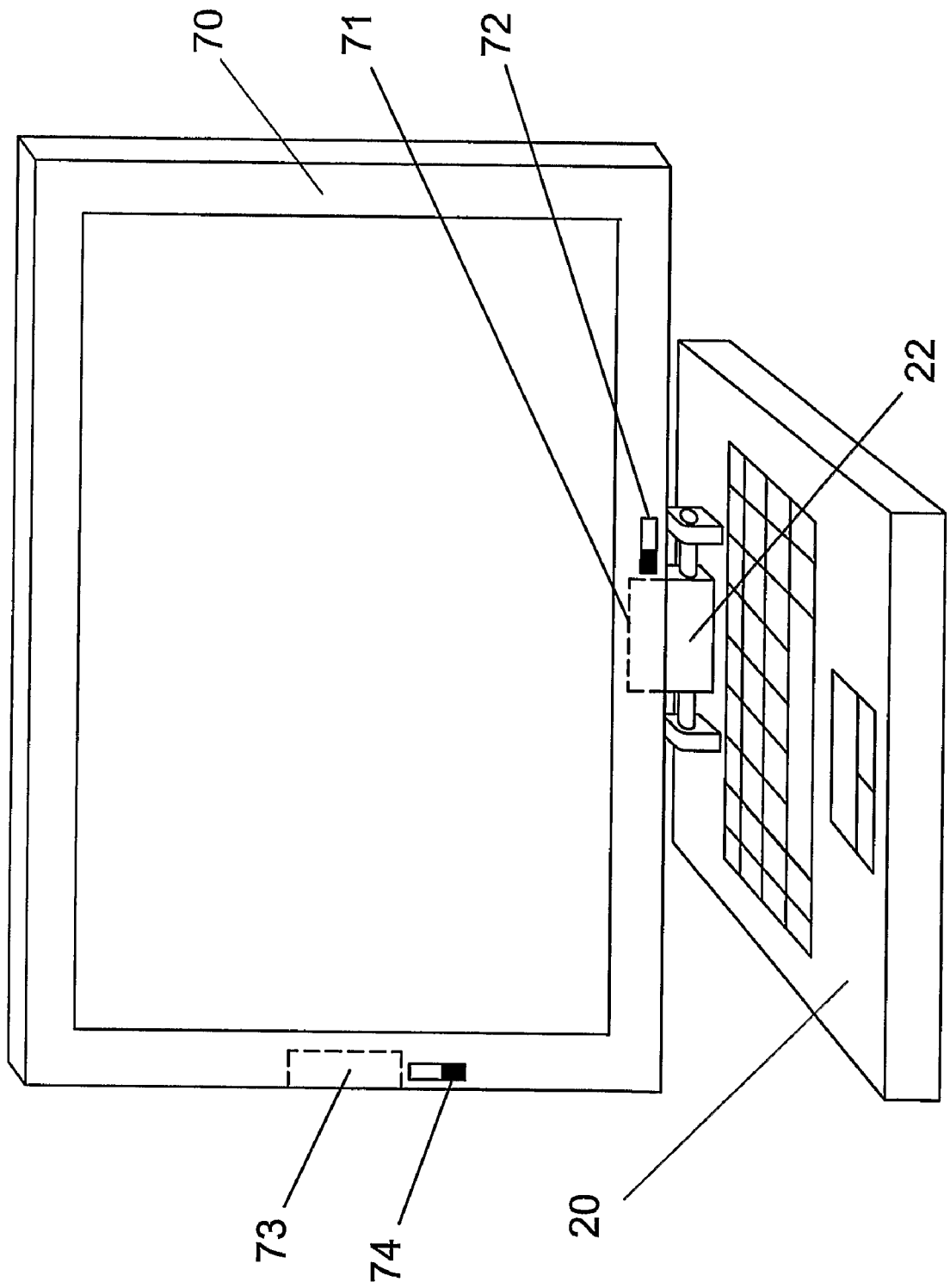
FIG. 7 is a perspective view of a portable computer, employing an alternate display panel having greater viewing area.

FIG. 7 illustrates the portable computer of FIG. 6 in which large display unit 70 has been substituted for small display unit 60. Display unit 70 includes receptacles 71 and 73, and latches 72 and 74, for removable attachment to connector 22 and base unit 20 in landscape or portrait orientations, respectively. Display unit 70 provides increased display area, which may be beneficial for applications requiring the simultaneous display of large amounts of data, such as spreadsheets and the like.

Figure 9:
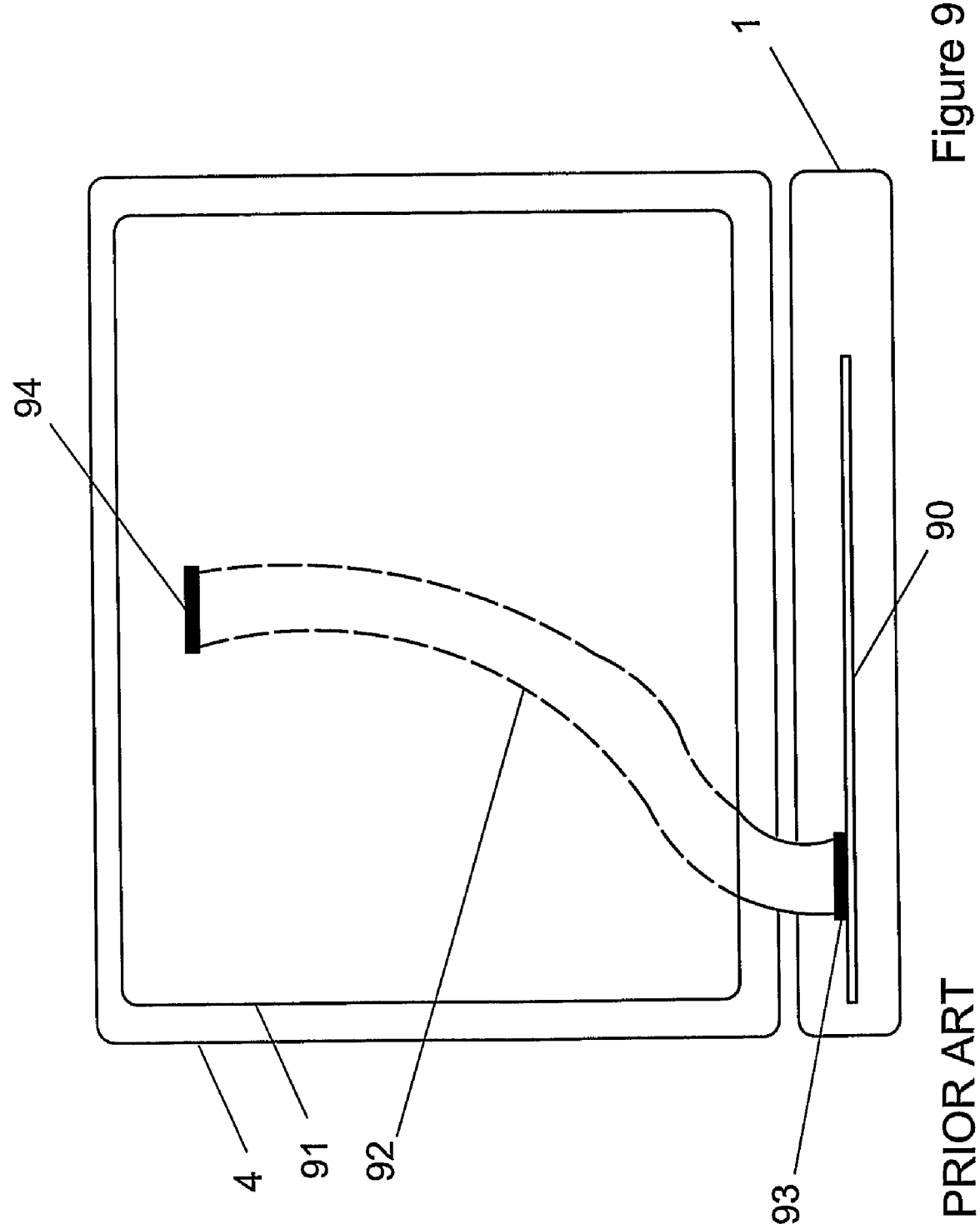
FIG. 9 is a schematic block diagram of the wiring interconnection between the base unit and display portions of a prior art portable computer.

FIG. 9 shows the electrical interconnection with a LCD display panel of a typical prior art portable computer having a fixed display orientation, such as that depicted in FIG. 1. Base portion 1 contains a system board 90 (i.e., a motherboard) that sends video signals to LCD panel 91 contained in the display unit 4. This is accomplished via wiring harness 92, which plugs into a video connector 93 on system board 90 on one end, and into the LCD panel video connector 94 on the other end. Connector 94 is typically located in the back of LCD panel 91. The wiring harness crosses over from base portion 1 to display unit 4 through adjoining slots, holes or apertures in the base and the display units. The wiring harness typically has some extra length that provides slack to allow the user to vary the viewing angle of the display unit without stressing the wiring harness or the connectors.

Figure 10:
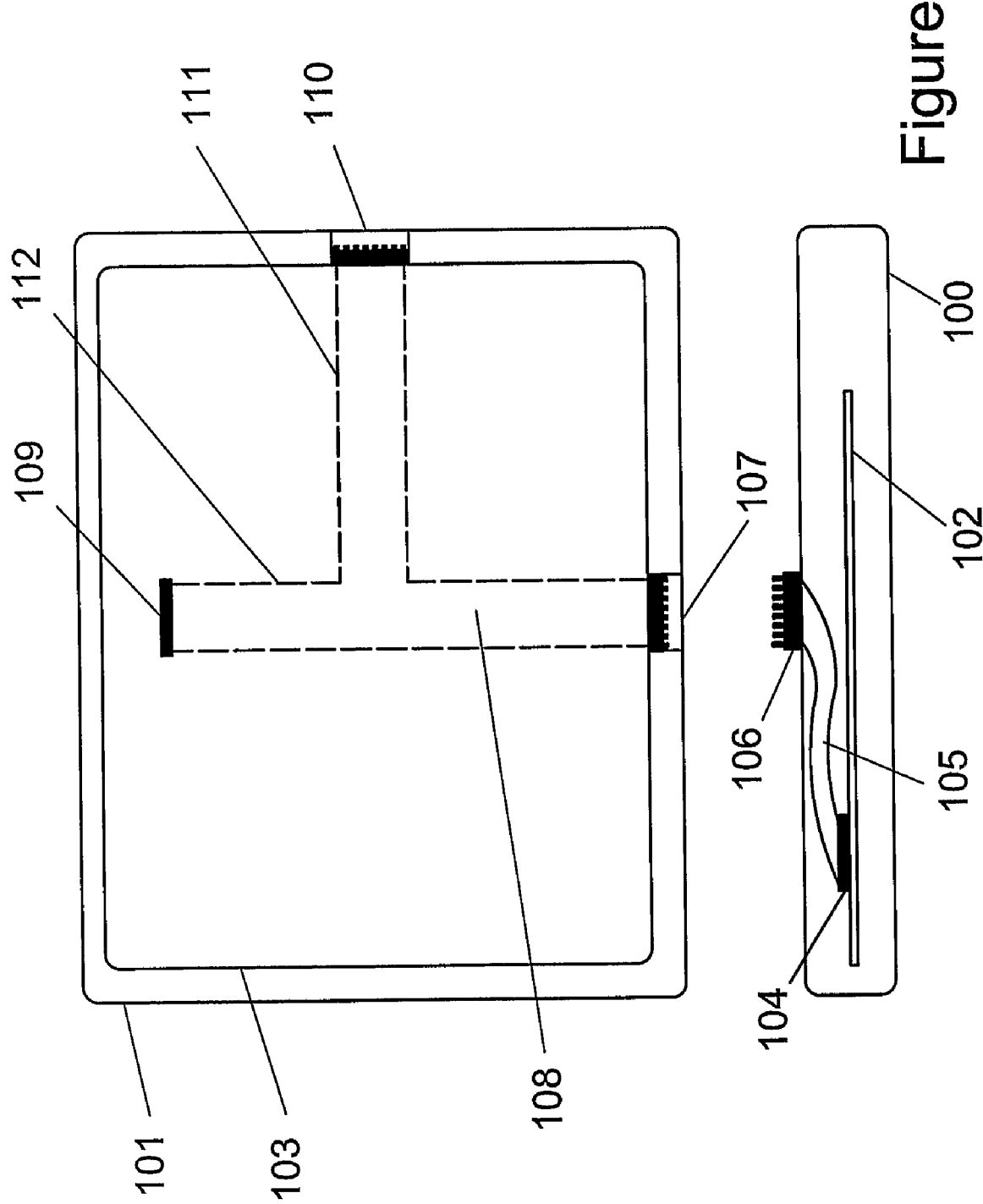
FIG. 10 is a schematic block diagram of the wiring interconnection between the base unit and display portions of a portable computer, in accordance with an embodiment of the present invention.

While there are many different ways to provide electrical interconnection between the base unit and a removable display unit of a portable computer such as that of FIG. 2, FIG. 10 shows the internal wiring of one such embodiment. Computer base unit 100 contains system board 102, which sends power, video and/or data signals to LCD panel 103 contained in display unit 101. This is accomplished by first sending the signal from system board connector 104 to base connector 106 via wiring harness 105. Connector 106 is a tiltable connector, to allow the user to adjust its angle with respect to the base. Wiring harness 105 is provided with some extra length to provide slack, thereby preventing stress on the harness and the connectors when the angle of the tiltable connector 106 is changed.

While connector 106 can be implemented using conventional frictional interconnection points, connector 106 preferably includes spring-loaded pins, which provide a reliable electrical connection while enabling rapid and easy insertion into, and removal from, an associated receptacle. Such a spring-loaded connector configuration may provide reduced frictional insertion and withdrawal forces as compared to other types of conventional connectors, thereby enabling connector 106 to withstand a high number of connection cycles and potentially reducing the difficulty of use for the user and the likelihood that the connector will fail.

Display unit receptacle socket 107 mates with connector 106 to receive power, video and/or data signals from the base when display unit 101 is attached in a landscape orientation, and convey those signals to LCD connector 109. Display unit 101 further includes receptacle socket 110, which can mate with connector 106 to receive power, video and/or data signals from the base when display unit 101 is attached in a portrait orientation. Receptacle socket 110 is also capable of conveying electrical signals to LCD connector 109.

Wiring harness 112 is used to lead power, video and/or data signals coming from receptacle sockets 107 and 110, to LCD connector 109. Wiring harness 112 has a vertical branch 108 connected to socket receptacle 107 and a horizontal branch 111 connected to socket receptacle 110. The vertical branch 108 is used when the display unit is plugged in landscape mode, and the horizontal branch 111 is used when the display unit is plugged in portrait mode.

In the illustrated embodiment, in which connector 106 includes spring-loaded pins, receptacle sockets 107 and 110 include sets of passive contacts that serve as landing contacts for the spring-loaded pins from connector 106. Alternatively, the spring-loaded pins could be provided in receptacle sockets 107 and 110, with passive landing contacts on connector 106. However, to the extent that spring-loaded connectors are often more expensive than passive contacts, it may be preferable to put the spring-loaded connectors on the base side, because on the base unit there is only one connector, while the display has two receptacles.

The configuration shown in FIG. 10 allows the user to easily plug the display unit into the base unit using either landscape or portrait modes as desired. However, in some embodiments and applications, the incorporation of two, alternative electrical signaling paths between the base unit and a display panel may introduce potential issues with electromagnetic interference ("EMI"). For instance, in the embodiment of FIG. 10, when the display unit is attached in the landscape orientation, the vertical branch 108 is the active branch, while branch 111 remains unused. However, in that case, branch 111 may act as an antenna and pick up noise and interference that can distort the signals conveyed to display connector 109—and potentially degrade the quality of the display image. Therefore, it may be desirable to implement electromagnetic shielding of wiring harness 112. Other known, active and passive EMI suppression techniques can be implemented to improve the integrity of signals conveyed on wiring harness 112.

Figure 11:
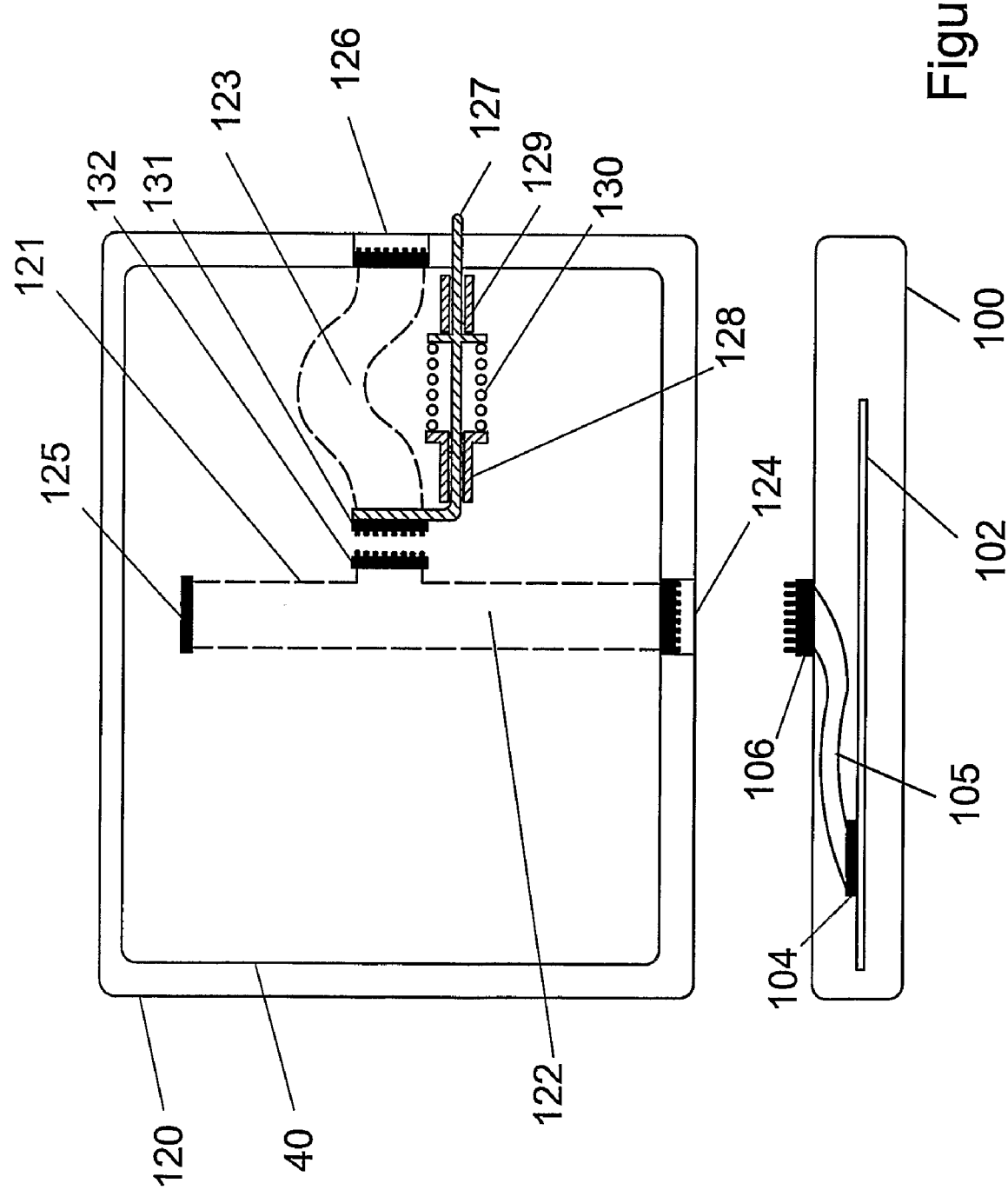
FIG. 11 is a schematic block diagram of the wiring interconnection between the base unit and display portions of a portable computer, in accordance with another embodiment of the present invention.

Another technique for controlling EMI on the display wiring harness is illustrated in FIG. 11. In the embodiment of FIG. 11, display unit 120 includes wiring harness 121, having vertical branch 122 and horizontal branch 123. Vertical branch 122 provides electrical interconnection between socket receptacle 124 and LCD panel connector 125. Horizontal branch 123 can provide electrical interconnection between socket receptacle 126 and LCD panel connector 125. However, horizontal branch 123 is separable from the main portion of wiring harness 121, such that an electrical connection is established only when display unit 120 is attached to base unit 100 in a portrait orientation. Accordingly, when horizontal branch 123 is in use, an electrical connection is provided. When horizontal branch 123 is not in use, the connection is opened to avoid undesired conductance of EMI onto wiring harness 121.

In the embodiment of FIG. 11, the connection and disconnection of horizontal branch 123 is achieved through the operation of finger 127. When display unit 120 is attached to base unit 100 in a portrait orientation, finger 127 is depressed by contact with the top surface of base unit 100. Finger 127 is a pin guided by guides 128 and 129, and is biased outwardly from the display unit by the operation of coil spring 130. One end of coil spring 130 bears against fixed pin guide 128, while the other end of spring 130 bears against a flange on finger 127, pressing the tip of finger 127 outwards from the surface of display unit 120. The opposite end of finger 127 supports connector 131, which mates with connector 132 when the display unit is attached to base unit 100 in a portrait mode. When display unit 120 is not plugged into base unit 100 in a portrait orientation, the force of spring 130 separates connector 131 from connector 132, thereby breaking the electrical connection of horizontal branch 123 from wiring harness 121. This structure keeps branch 123 disconnected from the wiring harness 121 when not in use, preventing it from acting as an antenna and creating interference problems. A similar structure can also be used to connect and disconnect the vertical branch 122. However, in many cases that is not necessary, because the electromagnetic fields involved are often directional, such that only one of the branches creates the described antenna effect. In general it has been found empirically during the development, prototyping and testing of this invention that it may be sufficient to disconnect one of the branches to sufficiently mitigate problems caused by EMI. While the embodiment of FIG. 11 provides a mechanical means of connecting and disconnecting a branch of the wiring harness, it is understood that electrical disconnection means could also be implemented.

Other embodiments of the present invention may utilize a plurality of connectors to releasably interconnect a display unit with a base unit. For example, the embodiment of FIG. 12 includes a base unit with two tiltable connectors. The computer base 140 is equipped with two friction hinges 141 and 142 that rotatably engage the ends of support shaft 143, so that shaft 143 can be caused to rotate around its long axis by overcoming the friction of hinges 141 and 142—thereby enabling a user to orient an attached display unit to a desired viewing angle. Tab connectors 144 and 145 are mounted at a fixed position along the length of shaft 143. Display unit 150 has receptacles 151 and 152 that can releasably receive connectors 144 and 145, respectively, to plug the display unit into the computer base unit in a landscape viewing mode.

Display unit 150 also includes receptacles 153 and 154, which can releasably receive connectors 144 and 145, respectively, to attach the display unit to the computer base unit in a portrait viewing mode. There are electrical mating contacts both on the connecting tabs 144 and 145, as well as within receptacles 151-154. While a variety of electrical contacts can be employed, in the embodiment of FIG. 12, spring-loaded pins are provided on base unit connectors 144 and 145, while passive contacts are provided in receptacles 151-154.

Figure 12:
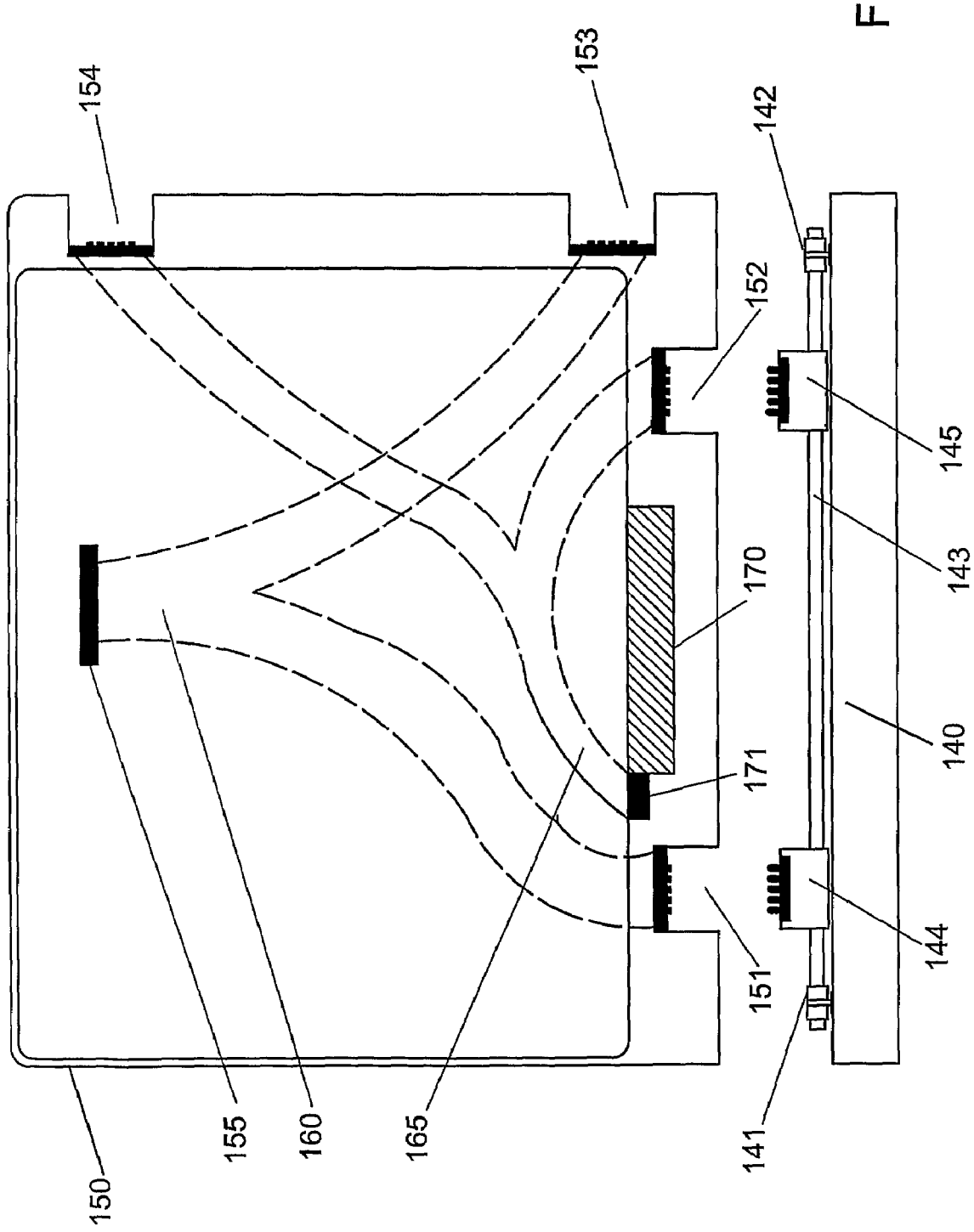
FIG. 12 is a schematic block diagram of a portable computer having two connector mounted on a rotating support shaft for attachment of a display unit to a base unit.

While it is understood that there are many possible ways in which signals can be routed in association with the present aspect of the invention, FIG. 12 illustrates one embodiment. Harness 160 is used to conduct video and data signals from the base unit, through receptacle 151 (when engaged in a landscape orientation) or receptacle 153 (when engaged in a portrait orientation) toward LCD connector 155. A second wiring harness 165 is used to send electrical power from the base unit to inverter 170 via inverter power connector 171.

Inverter 170 is a small circuit board attached to the LCD panel which operates as the power unit for the LCD panel, providing the high voltage required for the LCD panel backlight. Power is conducted from base unit 140 to inverter 170 through receptacle 152 (when engaged in a landscape orientation) or receptacle 154 (when engaged in a portrait orientation).

While potentially increasing the cost and complexity of the product, a dual connector configuration, such as that of FIG. 12, may provide both electrical and mechanical advantages over other, single connector configurations. For example, the dual connector configuration allows for increased physical separation between power and video signals, thereby reducing the potential for interference and crosstalk by running the signals in separate harnesses and through separate connectors. The dual connector configuration also provides two symmetrically placed points of support for the display, increasing the stability of the interconnection between the base and the display.

Figure 13:
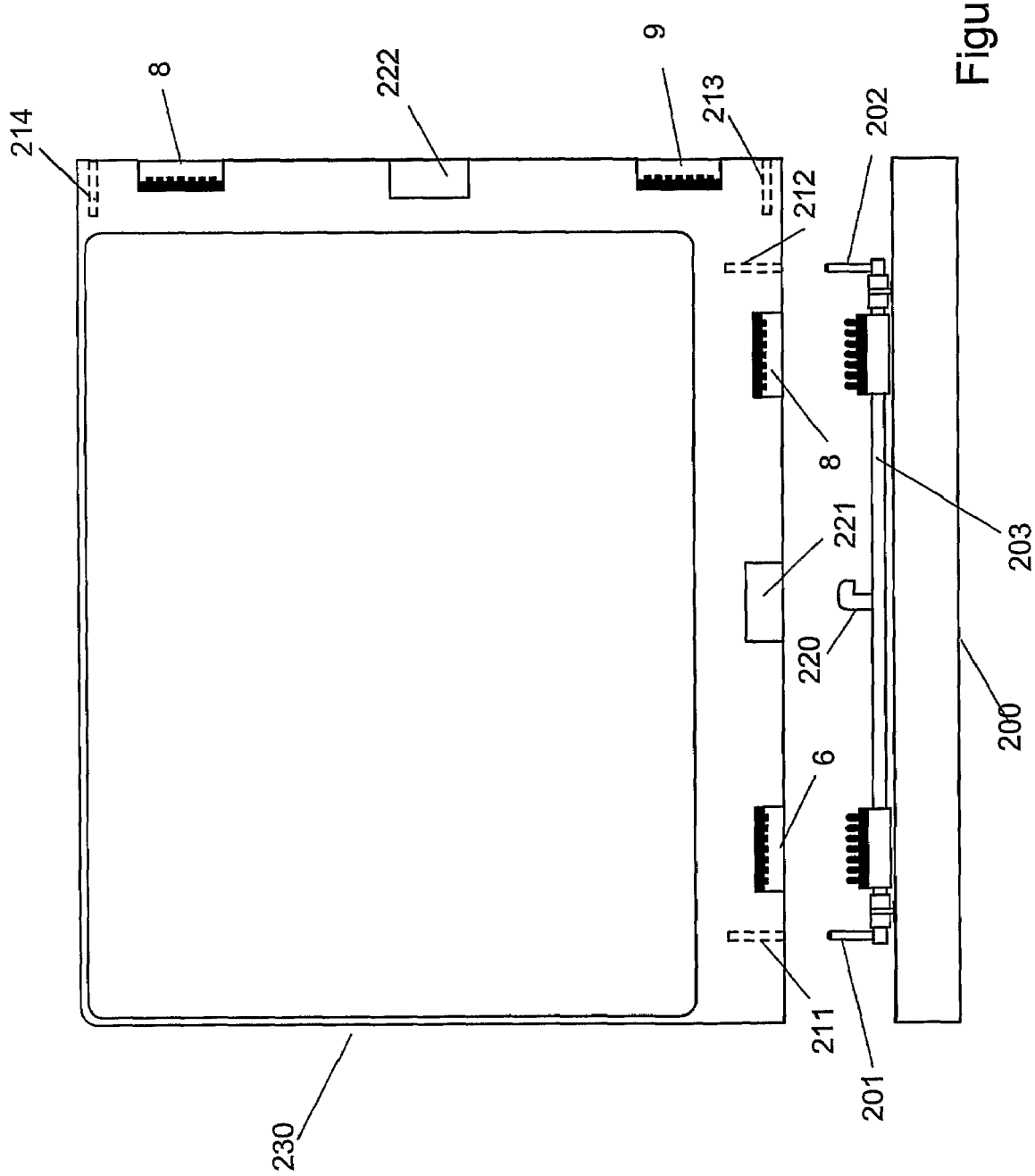
FIG. 13 is an elevation view of a portable computer which includes display support pins.

FIG. 13 shows another embodiment of a dual connector configuration. While some embodiments may rely upon the interconnection of base unit connectors with display unit receptacles to provide mechanical support for the display, in FIG. 13, base unit 200 includes support pins 201 and 202, which are attached to rotatable support shaft 203. Support pins 201 and 202 can be inserted into mating orifices 211 and 212 of display unit 210, to support the display unit in a landscape orientation. Support pins 201 and 202 can alternatively be inserted into mating orifices 213 and 214, to support display unit 210 in a portrait orientation. As illustrated, pins 201 and 202 are mounted with a press fit into holes in shaft 203; therefore they are locked onto that shaft and tilt along with that shaft when the user adjusts the viewing angle. Alternatively, support pins can be formed by other means, such as by bending the ends of the support shaft itself by 90 degrees, so that the ends of the shaft can be inserted into orifices 211 and 212 (for a landscape orientation) or orifices 213 and 214 (for a portrait orientation). In other embodiments, the support pins can be mounted to the display unit, and adapted for engagement with mating orifices provided in the base unit.

The embodiment of FIG. 13 also provides a latch 220 that automatically locks and secures the display unit in place when the display unit is plugged onto the base. The latch penetrates the slot of a slide mechanism (mechanism 221 when display 230 is used in a landscape orientation, or mechanism 222 when display 230 is used in a portrait orientation), displacing a spring-loaded slide and snapping into place. To unplug the display, the user has to manually push a button (not shown) so that the slide mechanism releases latch 220.

Figure 14:
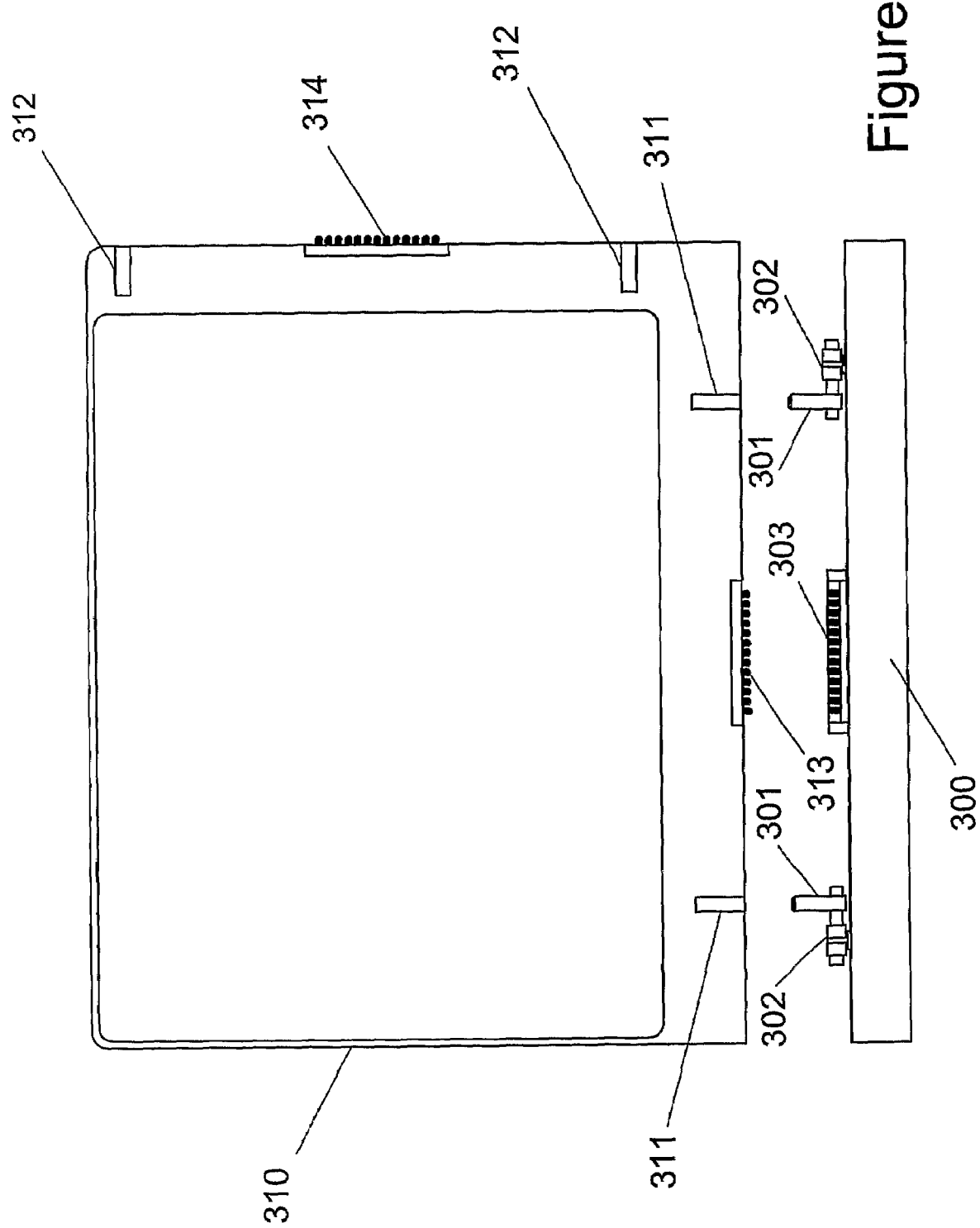
FIG. 14 is an elevation view of another embodiment of a portable computer, having an alternative means of interconnection between the base and display portions of the computer.

FIG. 14 illustrates another embodiment of the invention. Display unit 310 is mechanically connected to base unit 300 by means of two support pins 301, which each connect on one end with rotatable axes connected to friction hinges 302. Support pins 301 provide tiltable mechanical support for a display unit. Specifically, display unit 310 can be supported by base unit 300 in a landscape orientation by engaging support pins 301 with mating orifices 311. Display unit 310 can by supported by base unit 300 in a portrait orientation by engaging support pins 301 with mating orifices 312. The electrical interconnection between base unit 300 and display unit 310 is provided by cylindrical connector 303, which includes a set of landing contacts for spring-loaded contacts 313 (in landscape mode) or 314 (in portrait mode).

Figure 15:
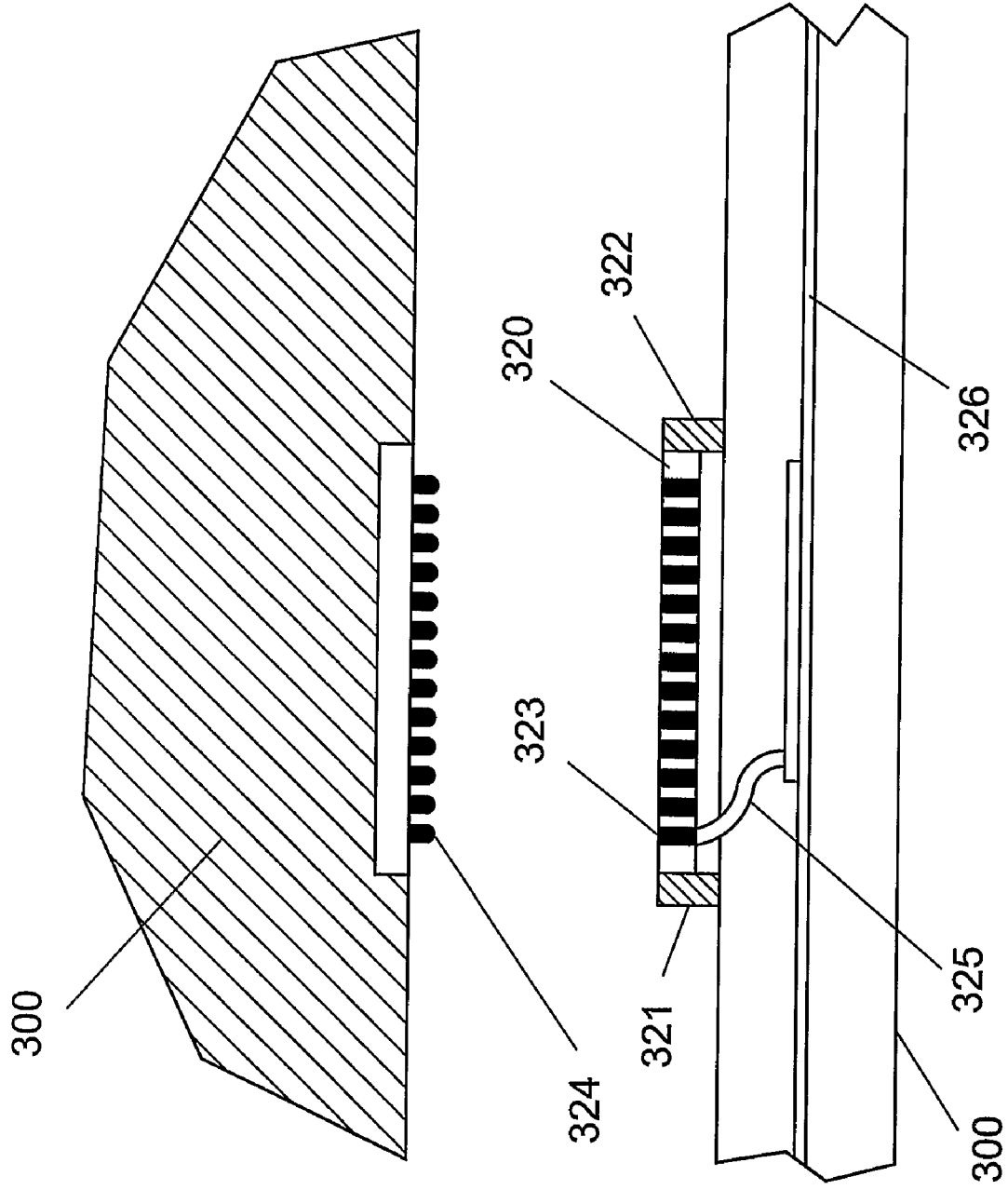
FIG. 15 is a further view of a connector illustrated in the embodiment of FIG. 14.

FIG. 15 shows an expanded view of cylindrical connector 303, amongst other components. The connector includes a cylindrical body 320, supported by mounting brackets 321 and 322. Cylindrical body 320 has a plurality of parallel conductive traces 323 on its surface that wrap around the cylindrical body of the connector, in planes perpendicular to the longest axis of cylindrical body 320. Each of conductive traces 323 is adapted to removably contact one of spring-loaded pins 324, which are mounted on the display unit. Each trace 323 is also connected to system board 326 within base unit 300, e.g., via solder connection to one of wires 325 (only one of which is shown, for clarity of illustration) which lead to system board 326. Thus, video, power and/or data signals can be conveyed from system board 326, through wires 325, to traces 323. Traces 323 engage spring-loaded contacts 324, towards carrying the signals to the LCD display.

Figure 16:
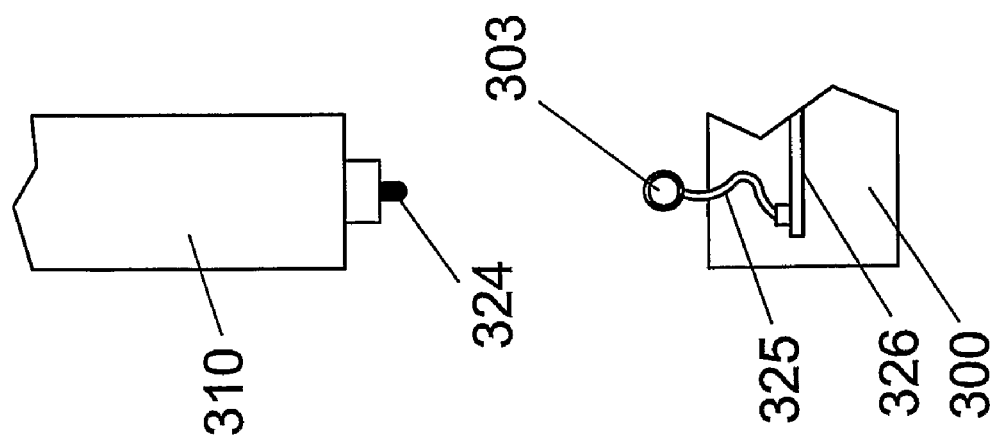
FIG. 16 is a cross-sectional view of a cylindrical connector from the embodiment of FIG. 15, in which the base portion and display portions of the connector are disengaged.

FIG. 16 is a cross-sectional side elevation of the arrangement of FIG. 15, showing display unit 310 detached from base unit 300, with the spring-loaded pins 324 separated from the cylindrical connector 303.

Figure 17:
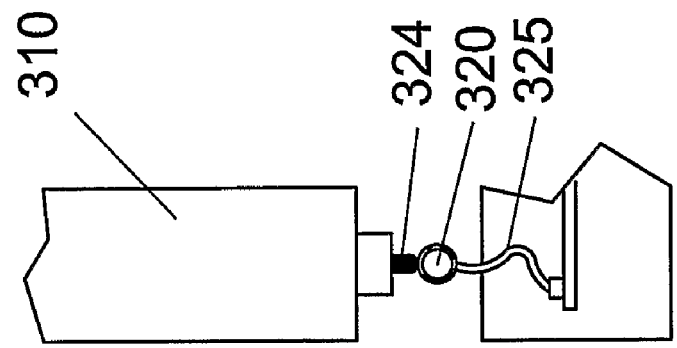
FIG. 17 is a cross-sectional view of the cylindrical connector, in which the base portion and display portions of the connector are engaged.

FIG. 17 is a cross-sectional side elevation of the arrangement of FIG. 15, in which display unit 310 is attached to base unit 300. Spring-loaded pins 324 are in contact with conductive traces 323 on cylindrical body 320, thereby electrically connecting the display unit with the system board.

Figure 18:
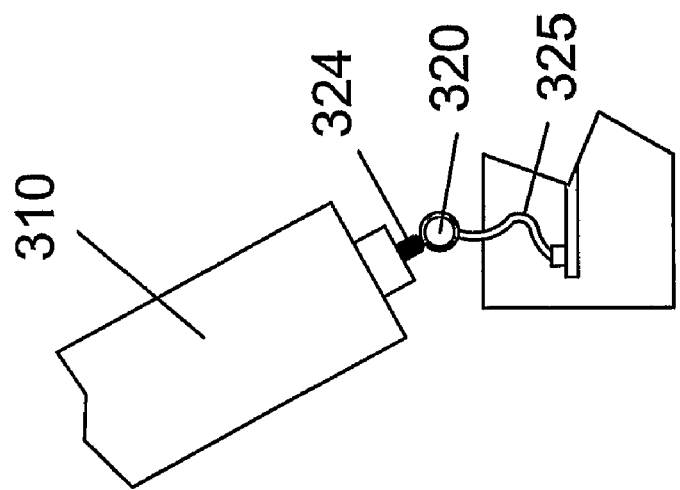
FIG. 18 is a cross-sectional view of the cylindrical connector, in which the base portion and display portions of the connector are engaged in an alternate orientation.

FIG. 18 shows the arrangement of FIG. 17, in which display unit 310 has been tilted to alter the viewing angle of the display. As the angle of display unit 310 is changed, spring-loaded pins 324 remain in contact with the cylindrical body 320, riding along the circumference of conductive traces 323. The cylindrical connector thereby provides a reliable electrical connection between the base unit and display unit at any tilting angle, without the risk of stressing wires or connectors. While the embodiment described above involves attachment of the cylindrical connector to the base unit, with spring-loaded contacts connected to the display unit, it is understood that alternate configurations could be readily implemented. For example, the cylindrical connector could be integrated with the display unit, with mating contacts provided on the base unit. Alternatively, the cylindrical connector may be semicircular in cross-section, or even oval in cross-section, to the extent that the mating contacts are able to move along the circumference of the connector bar while maintaining contact with the traces thereon.

Figure 19:
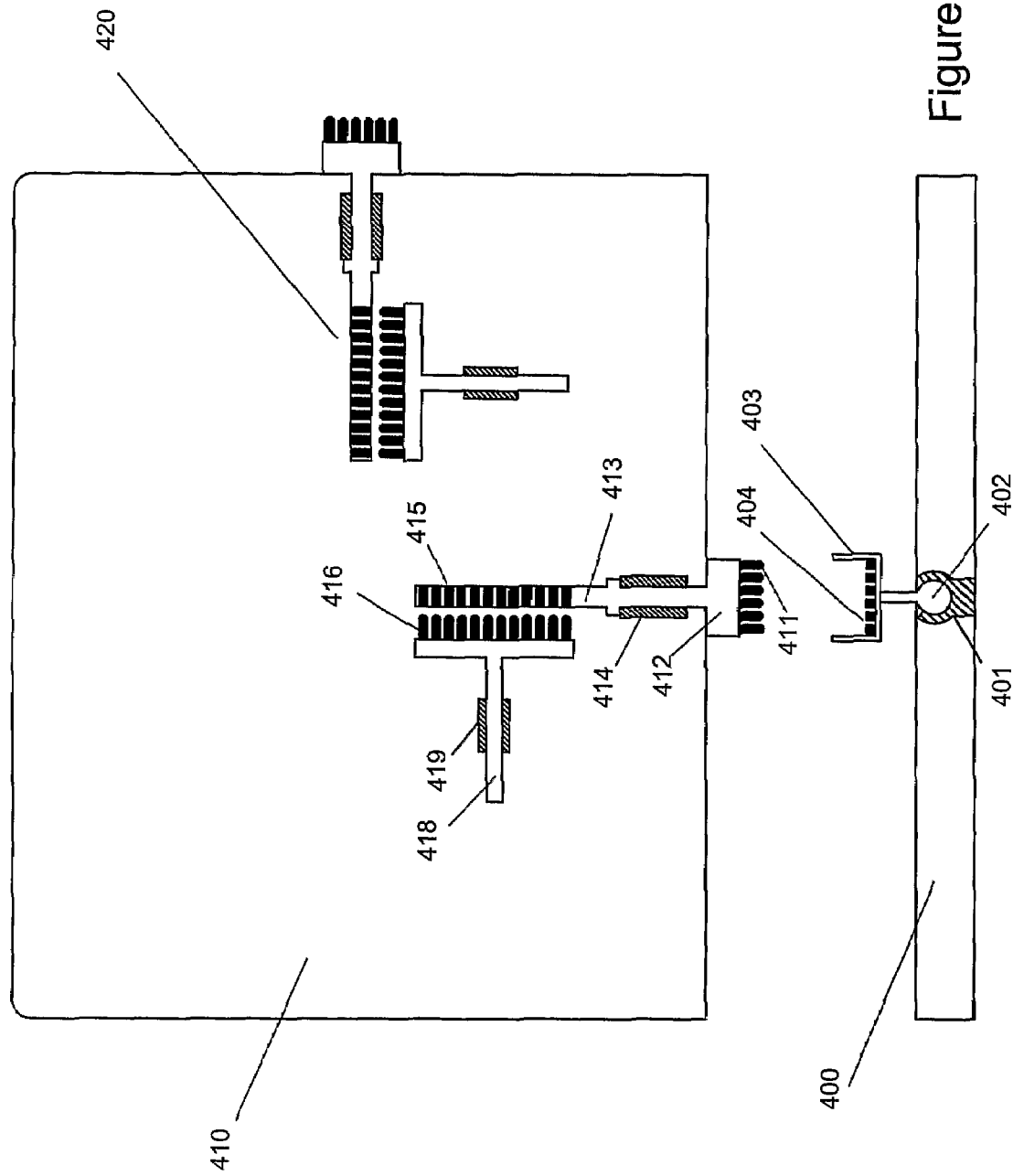
FIG. 19 is a schematic elevation view of a portable computer having a tiltable and rotatable display.

FIG. 19 shows a cross-sectional elevation of another type of connector that can optionally be used in connection with the present invention. The central rotary connector illustrated in FIG. 19 allows for not only tilting of the removable display, but also rotation of the display in order to be able to turn the display toward another person during a presentation or discussion. Socket 401 is attached to base unit 400, and it rotatably supports ball joint 402. Ball joint 402 carries receptacle 403. Receptacle 403 houses electrical contacts 404.

Display unit 410 includes connector 412, mounted on its edge. Connector 412 includes contacts (such as spring-loaded contacts) 411. Display connector 412 can be plugged into base unit receptacle 403, to provide electrical and mechanical interconnection between display unit 410 and base unit 400. Connector 412 is attached to cylindrical shaft 413. Shaft 413 is retained and positioned by sleeve bearing 414. The upper portion of shaft 413 includes a plurality of parallel conductive traces 415, which wrap around the cylindrical surface of shaft 413.

Display unit 410 further includes internal connection arm 418, supported by guide 419. Connection arm 418 includes spring-loaded contact pins 416, each of which contacts one of conductive traces 415. Connection arm 418 may be biased by a spring (not shown) against shaft 413, permitting connection arm 418 to move radially with respect to shaft 413, while compressing pins 416 against traces 415 to establish and maintain an electrical connection between them. This structure allows the user to rotate display unit 410 around shaft 413 in either direction, and for any number of complete turns, without losing or interrupting the electrical connection with the base unit. An analogous structure 420 is also located inside the display unit, oriented perpendicularly to the above-described display unit structure. Structure 420 provides a rotatable connector on an adjacent side of the display unit, to allow the user the same capabilities while the display unit is engaged with the base unit in a portrait orientation.

Figure 20:
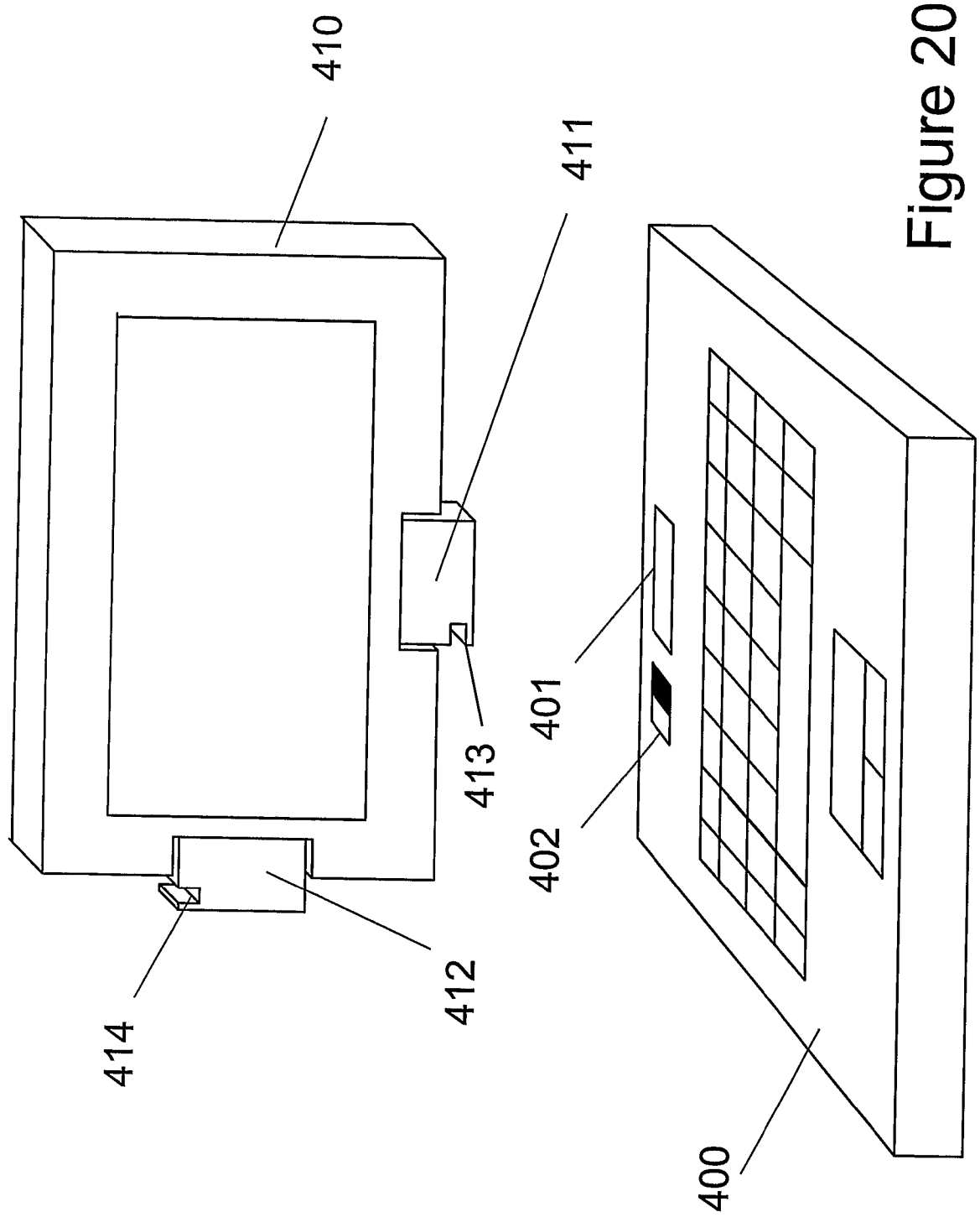
FIG. 20 is a perspective view of another embodiment of a portable computer.

FIG. 20 is a perspective view of another embodiment of the invention, in which the locations of the tilting connectors and receptacles are reversed as compared to, for example, the embodiment of FIG. 2. Whereas, in certain above-described embodiments, tilting connectors were provided on a base unit, in the embodiment of FIG. 20, display unit 410 includes tilting connectors 411 and 412. Base unit 400 includes connector receptacle 401. Thus, the computer can be configured with a landscape mode display by engaging connector 411 into receptacle 401, while a portrait orientation display can be configured by engaging connector 412 into receptacle 401. Each of connectors 411 and 412 include friction hinges, which allow the user to adjust the viewing angle as needed. Moreover, because the friction hinges are provided as part of the display unit in the embodiment of FIG. 20, the resistance of each hinge to movement can be matched to the particular size, weight and orientation of the display to which it is attached, such that the computer can be used with a wide variety of display sizes and weights, while maintaining consistent levels of mechanical support for each display. In sum, the tilting connectors and the mating cavity serve as a mechanical, electrical and data interface between the base and the display unit. Spring-loaded latch 402 engages notch 413 (in landscape mode) or notch 414 (in portrait mode) to further secure display unit 410 onto base unit 400. Alternatively, it is understood that other means of securing the display unit to the base unit can be employed.

The size and weight of current conventional portable computers is largely determined by the size of the display panel. In configuring such conventional portable computers having fixed displays, one often chooses a large display, because it is the only display that will be available for that PC and some applications may benefit from the use of a large screen. However, many applications do not require a large screen. This is especially true of mobile applications, such as contact information and email messaging. Thus, many conventional portable computers have excess capability for mobile applications, at the cost of decreased portability.

The Personal Digital Assistant, or "PDA", can provide a small and highly portable computing solution, but typically provides substantially less computing power and storage capability than a portable computer. PDAs often cannot run some of the software that users normally use in their PCs. If the PDA provides any sort of keyboard at all, it typically requires a stylus, and is often small, slow, cumbersome and difficult to use. Many PDA use their own operating system, which can be a significant inconvenience and incompatibility issue for some users. Finally, PDAs can create a synchronization issue, where the user has to periodically transfer data from the PC to the PDA, and vice versa, to keep the information up to date on two separate devices. Thus, it may be desirable to provide a device with the power and capabilities of a personal computer, but a size that is smaller and/or lighter than typical personal computers. In some modular computer systems having a display unit that is separable from a base unit, it may be desirable to provide a base unit that is operable even in the absence of an attached display unit. In accordance with one aspect of the present invention, such a "PDA-PC" device is provided.

Figure 21:
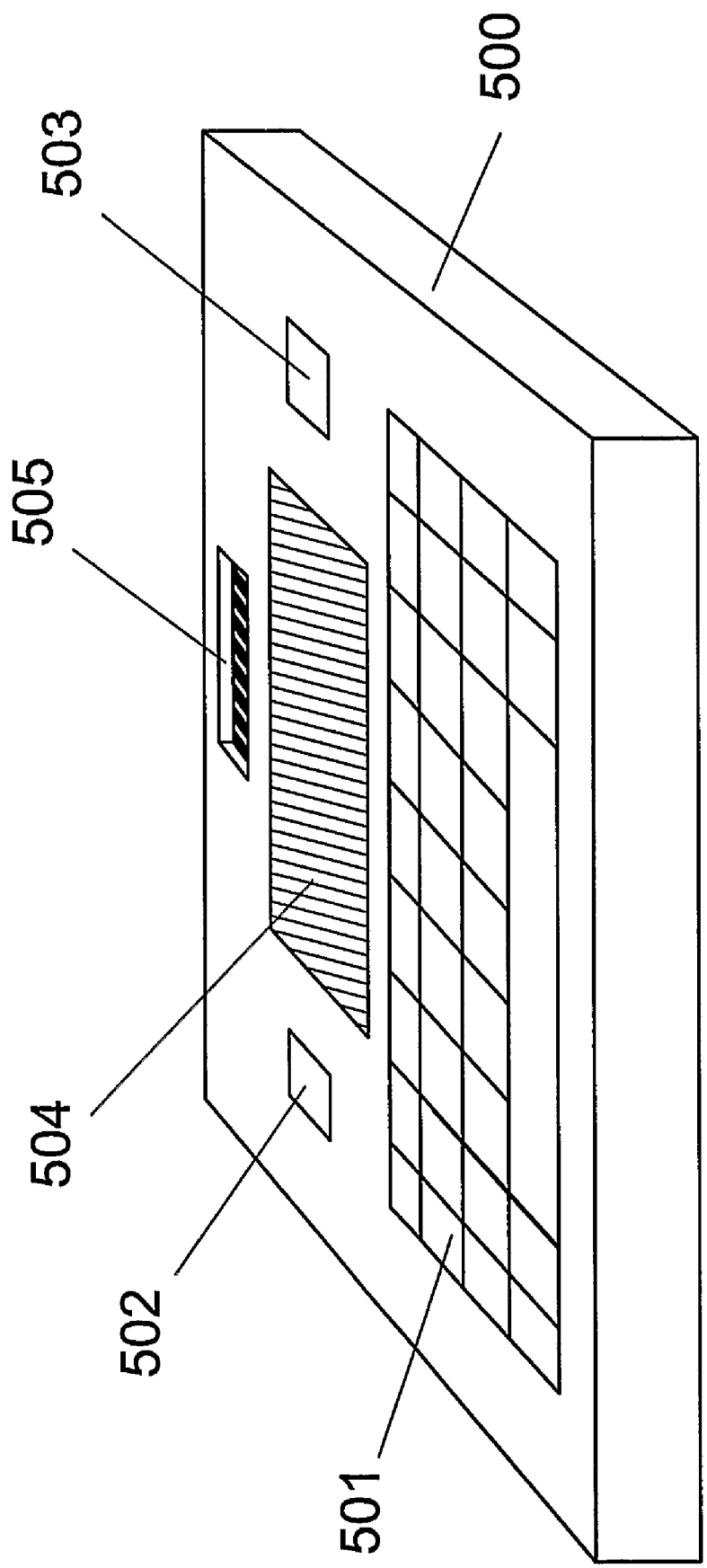
FIG. 21 is a perspective view of a portable computer in accordance with a further embodiment of the invention.

FIG. 21 shows one embodiment of such a PDA-PC. PDA-PC base unit 500 includes keyboard 501, left mouse button 502, and right mouse button 503. A small built-in LCD display 504 is provided within base unit 500. Connecting receptacle 505 is provided for receiving an optional display unit. While a conventional touchpad, trackball, pointing stick or other pointing device can be provided for navigating a graphical user interface, the embodiment of FIG. 21 includes a touch panel integrated into the LCD display 504. The touch panel can be operating using a stylus, or it can be finger-operated. Alternatively, a wireless mouse can be optionally provided.

The PDA-PC of FIG. 21 is self-contained and operational anywhere at any time, inasmuch as the built-in LCD display 504 is sufficient for typical mobile applications and even for many office and home applications that do not require a large screen. The unit can be lighter, smaller, easier to transport and significantly less expensive than a conventional portable PC because, inter alia, the large and costly built-in LCD display has been eliminated.

Figure 22:
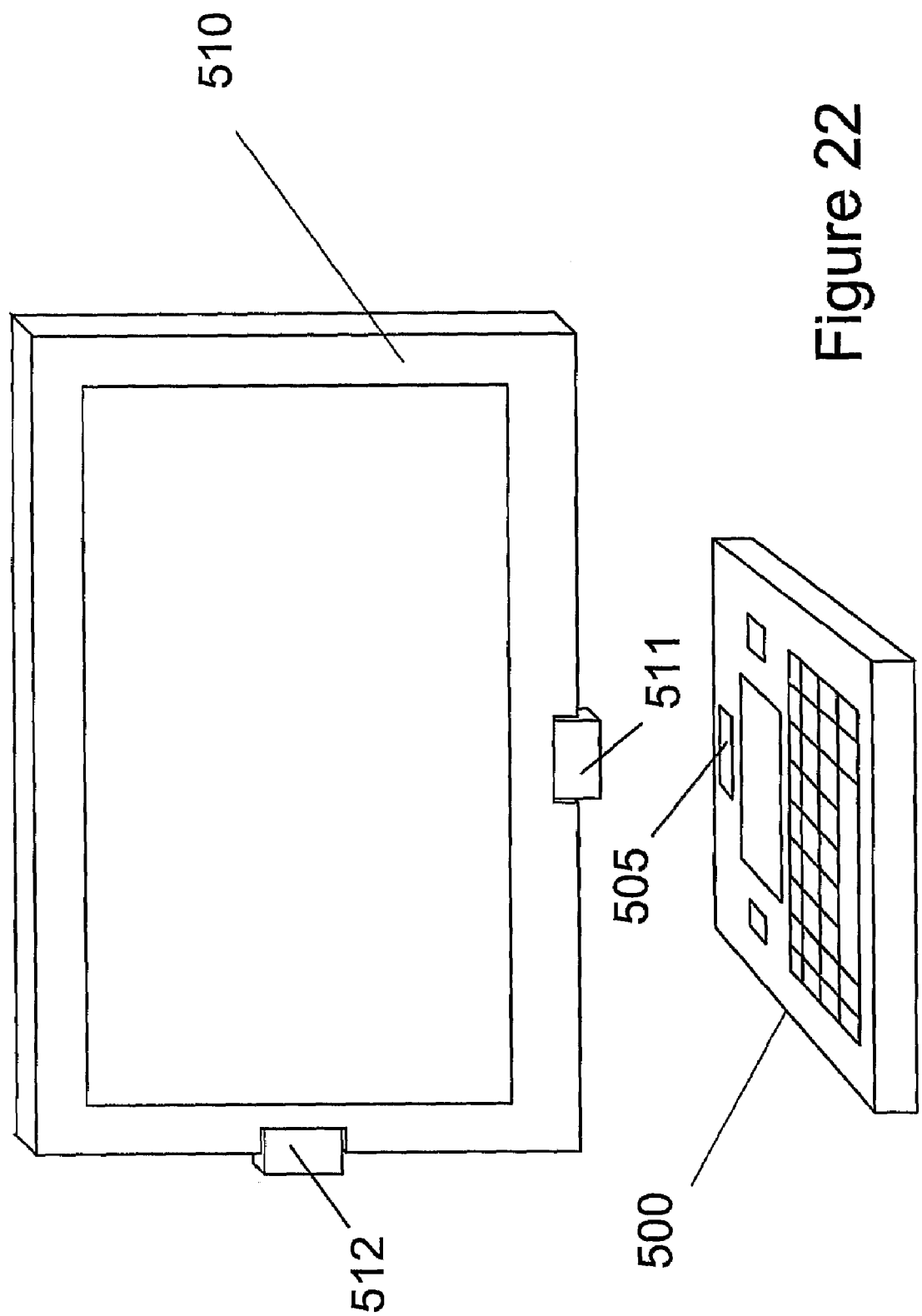
FIG. 22 is a perspective view of the portable computer of FIG. 21, with a detachable display panel.

FIG. 22 is a perspective view of PDA-PC base unit 500, oriented to receive modular LCD display unit 510. Display unit 510 is designed analogously to display unit 410 of FIG. 20. Specifically, display unit 510 is provided with tilting connectors 511 and 512, which are adapted to engage receptacle 505 on base unit 500 in a landscape or portrait orientation, respectively. Thus, by attaching a separable display unit to base unit 500, the PDA-PC can be provided with a screen of virtually any size at any time, turning this compact device into a computer capable of performing complex office functions, working with large spreadsheets or documents, and operating sophisticated graphics and design applications. The higher screen utilization that results from the dual viewing modes can also reduce the need to use a very large screen. Thus, typical users of the PDA-PC of FIGS. 21-22 may use a 10" to 12" dual view screen with the PC-PDA when a display screen other than LCD 504 is required, with more demanding users employing a 14" dual view screen. Sizes larger than that will often be unnecessary because the dual viewing modes provide a substantially higher screen efficiency. For example, it has been found that in some word processing applications, the use of a dual view display, in which the optimum screen orientation can be selected, can significantly increase the amount of information displayed on the screen. In such applications, a 12" display with dual view as effective, or even more effective, than a conventional 14" fixed aspect ratio display. Also, users who regularly travel between two locations, such as their home and their office, can keep separate, appropriately-sized LCD display units at each location. The PDA-PC can then be easily transported between locations. The user need not worry about synchronizing data between multiple computers and/or a PDA, and the computer remains useful for at least mobile applications while traveling, even in the absence of a separate display unit.

In accordance with yet another aspect of the invention, a portable computer is provided with a display that can switch between landscape and portrait orientations, without separating the display unit from the base unit. Rather, an attachment mechanism allows the user to slide and rotate the display from one viewing mode to the other.

Figure 23:
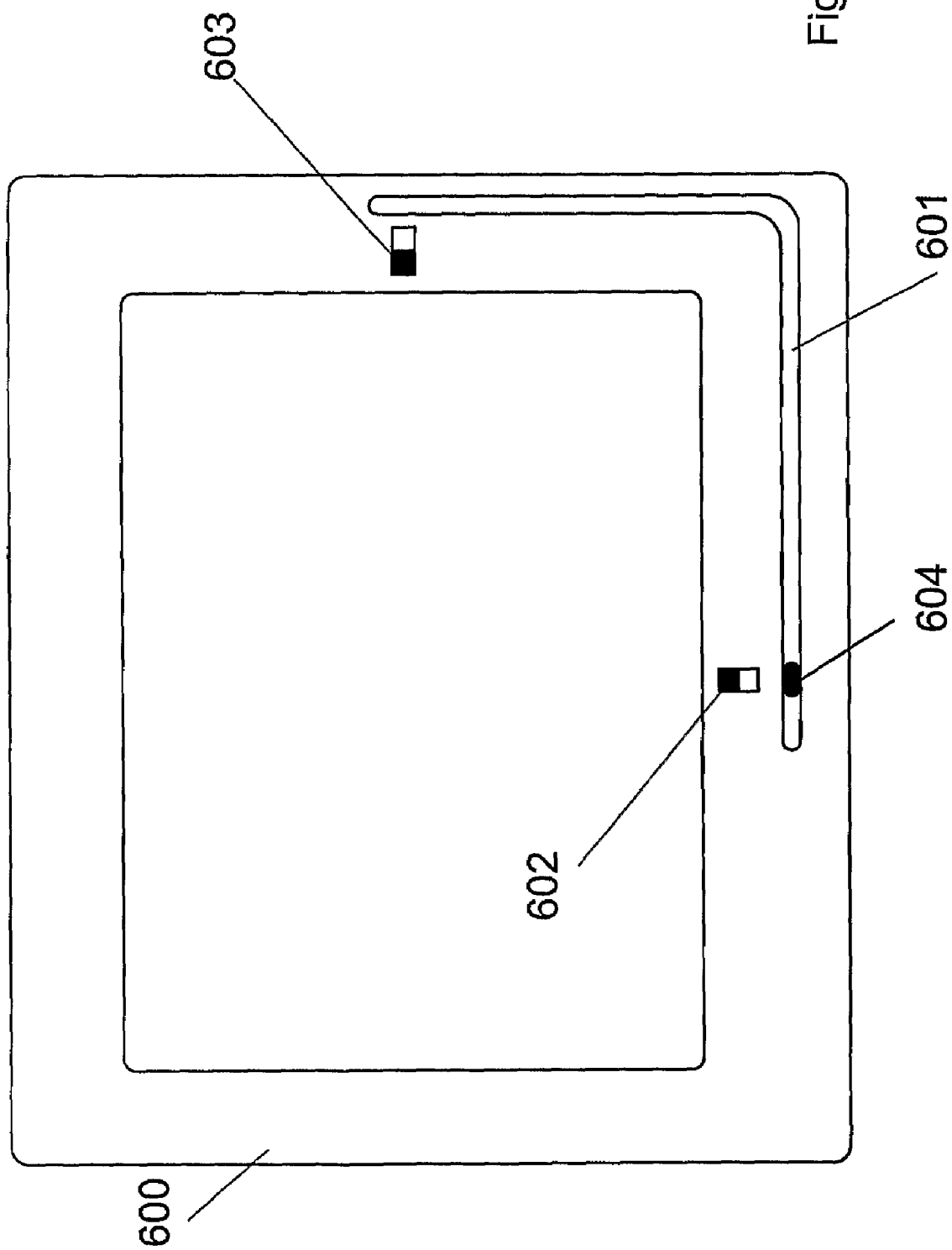
FIG. 23 is a front elevation of a portable computer display in accordance with another embodiment of the present invention.
Figure 24:
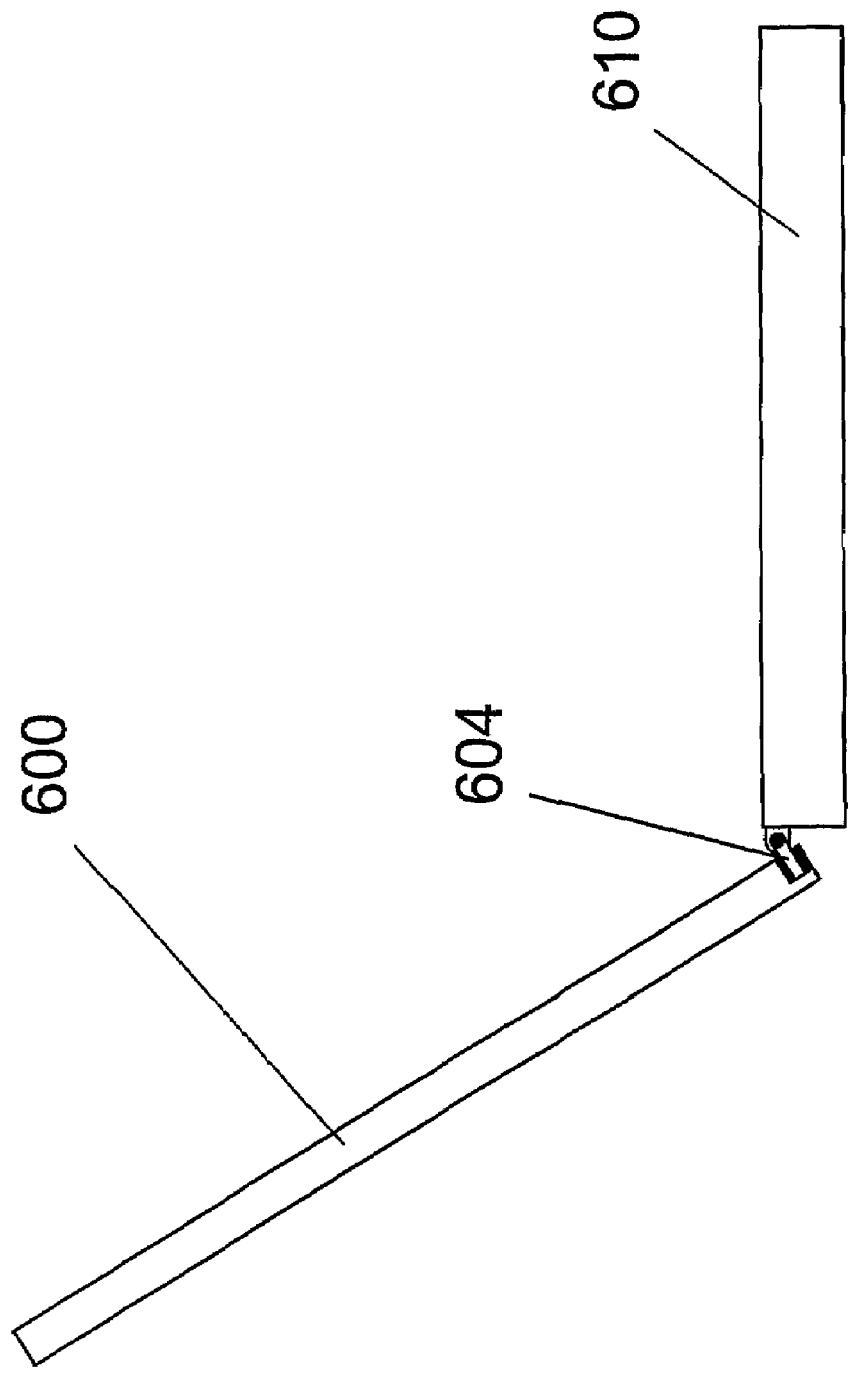
FIG. 24 is a cross-sectional side elevation of a portable computer employing the display of FIG. 23.

FIG. 23 shows a front elevation of such a rotatable display unit. Display unit 600 includes guiding groove or slot 601. In the illustrated embodiment, slot 601 extends parallel to two adjacent sides of display unit 600. Sliding arm 604 engages within slot 601 and is capable of moving along the full length of slot 601, while providing physical support to display unit 600. Sliding arm 604 includes a support arm that is connected to a computer base unit, as shown in FIG. 24. By moving sliding arm 604 from one leg of slot 601, around the corner and into a perpendicular leg of slot 601, display unit 600 can be changed from a landscape to a portrait orientation, and vice versa. Latches 602 and 603 can be used to engage sliding arm 604 and lock the display in a fixed position.

FIG. 24 shows a cross-sectional side elevation of display unit 600, attached to the back of computer base 610 via sliding arm 604. Sliding arm 604 is attached to base unit 610 via a hinge system which allows for adjustment of the viewing angle of display unit 600, while also permitting sliding arm 604 to slide and pivot around slot 601 so that the computer display can switch between landscape and portrait orientations.

Figure 25:
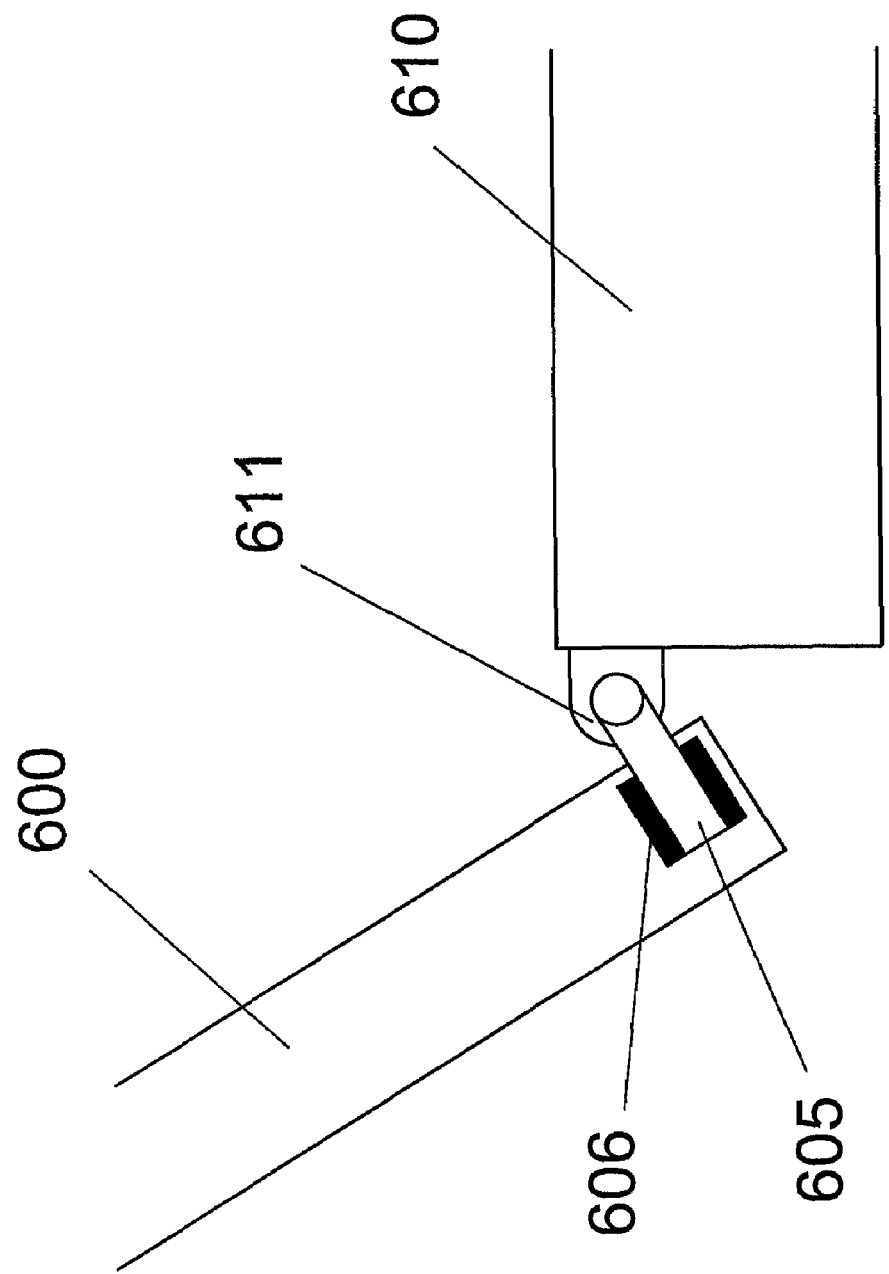
FIG. 25 is an expanded cross-sectional view of a portion of the portable computer of FIG. 24.

FIG. 25 shows a mechanism for attaching display unit 600 to base unit 610 in more detail. Sliding arm 604 includes support arm 605 and sliding block 606. Friction hinges 611 engage and support one end of support arm 605, while allowing arm 605 to rotate around hinges 611 in a friction-restrained manner, thereby permitting display unit 600 to be tilted to adjust the viewing angle. Sliding block 606 is mounted on the other end of support arm 605. Sliding block 606 can slide within slot 601 of display unit 600.

The electrical interconnection between base unit 610 and display unit 600 can be implemented in many different ways by a person of ordinary skill in the art. One way in which the electrical interconnection can be implemented is by providing a support arm 605 which is hollow, such that a multiconductor cable is routed from the system board, inside of the base unit, through support arm 605, to sliding block 606. Sliding block 606 is provided with a plurality of electrical contacts. The contacts on sliding block 606 engage mating contacts provided within slot 601 of display unit 600. In particular, a first set of contacts is provided at one end of slot 601, such that the first set of contacts mates with the contacts on sliding block 606 when display unit 600 is moved to a landscape orientation. A second set of contacts is provided at the opposite end of slot 601, such that the second set of contacts mates with the contacts on sliding block 606 when display unit 600 is moved to a portrait orientation. Therefore, in this embodiment, a single, sliding arm is capable of providing both physical and electrical interconnection between the base unit and the reconfigurable display unit.

Figure 26:
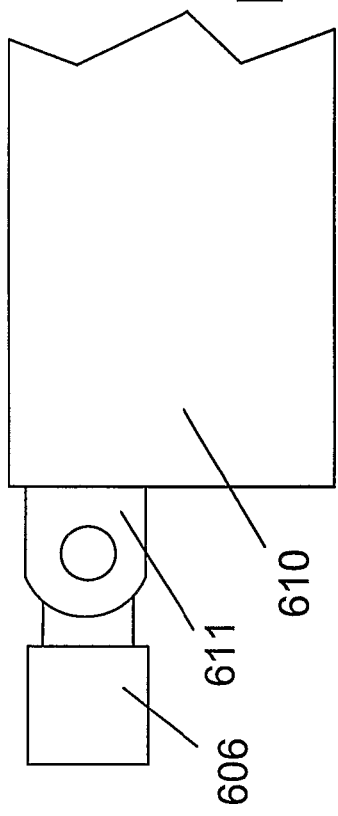
FIG. 26 is a side elevation of a portable computer base unit of FIG. 24, without the display unit.
Figure 28:
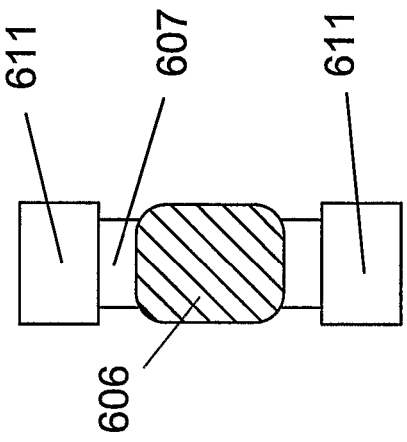
FIG. 28 is a rear elevation of the hinge and support arm for a portable computer display.
Figure 27:
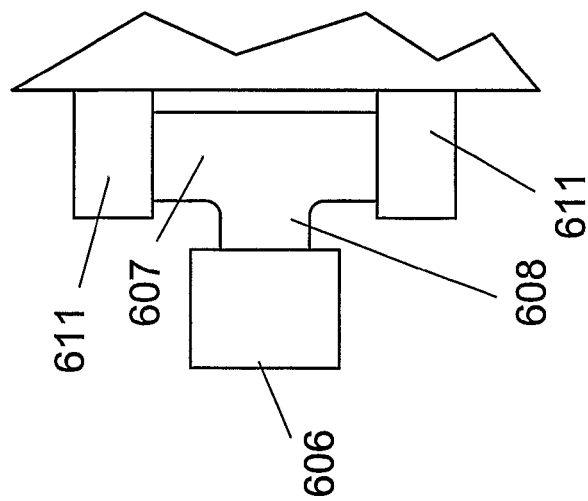
FIG. 27 is a top plan view of the hinge and support arm for a portable computer display.

FIGS. 26, 27 and 28 show three further views of the sliding and pivoting system. FIG. 26 is a side elevation of base unit 610, without display unit 600. FIG. 27 is a top plan view of a portion of base unit 610, including the sliding and pivoting system. The support arm includes rotating support shaft portion 607, and cylindrical finger 608. Each end of support shaft 607 is rotatably supported by one of friction hinges 611, which are mounted near the back edge of base unit 610. Shaft 607 is attached to finger 608, which holds sliding block 606. Sliding block 606 can be inserted into a guiding slot in a display unit, facilitating easy, guided movement of the display unit along that slot. FIG. 28 is a rear elevation of support block 606, support shaft 607 and hinges 611.

While FIGS. 24-28 illustrate one structure that can be used to implement the present invention, it is understood that alternative movable attachment means can be employed to provide the sliding attachment between the base unit and display unit, whereby the display unit can be moved between landscape and portrait orientations. For example, the base unit can be provided with a support arm attached to a ball-joint pivot. Also, instead of a sliding block engaging a channel or slot in the display unit, the attachment mechanism could also include a roller, a plurality of rollers or another sliding structure that fits inside a guiding groove or slot.

Figure 29:
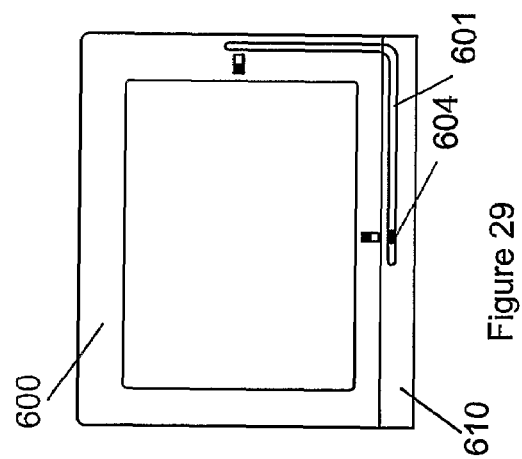
FIG. 29 is a front elevation of the portable computer of FIG. 25, in which the display is oriented in a landscape configuration.

FIGS. 29-33 illustrate the operation of a sliding and pivoting system to reconfigure a display unit from a landscape orientation to a portrait orientation. FIG. 29 shows display unit 600 and computer base 610. Support arm 604 is rotatably attached to base unit 610 at one end and inserted into guiding slot 601 at the other end. Guiding slot 601 has two portions: a horizontal first portion and a vertical second portion (although their relative positions will change as the user switches viewing modes, with the first portion becoming vertical and the second portion becoming horizontal).

Figure 30:
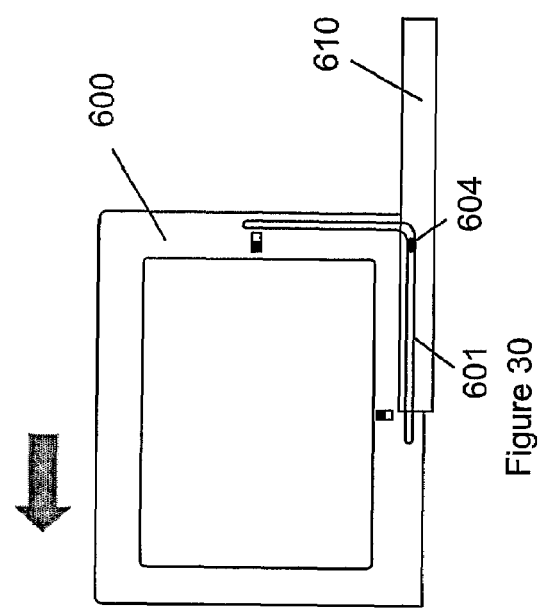
FIG. 30 is a front elevation of the computer of FIG. 29, in which the display is partially transitioned between landscape and portrait orientations.
Figure 32:
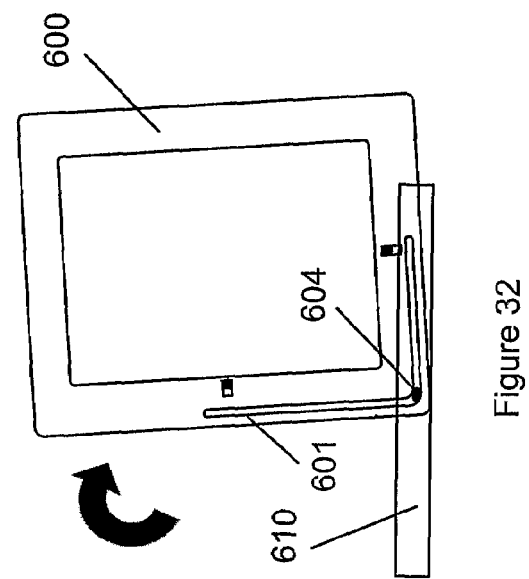
FIG. 32 is a front elevation of the computer of FIG. 31, in which the display is further transitioned between landscape and portrait orientations.
Figure 31:
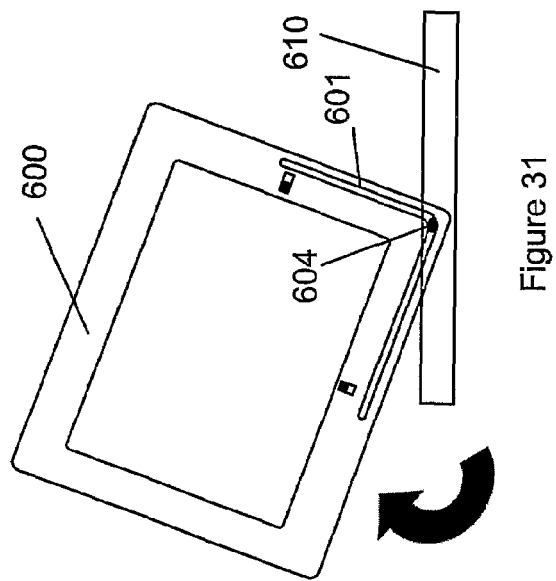
FIG. 31 is a front elevation of the computer of FIG. 30, in which the display is further transitioned between landscape and portrait orientations.

In FIG. 30, display unit 600 has been pushed towards the left, such that support arm 604 has traveled along the horizontal first portion of slot 601, while maintaining the attachment of display unit 600 to base unit 610. In FIGS. 31 and 32, display unit 600 is rotated clockwise, in order to move sliding support arm 604 from the first portion of slot 601 around to the second portion. In FIG. 33, display unit 600 has been pushed to the left, such that support arm 604 slides along the length of the second portion of slot 601, until display unit 600 is centered with respect to base unit 610 and in a portrait orientation. At this point, latch 603 can be actuated to lock the display unit in its position by preventing support arm 604 from rotating or sliding along slot 601. However, even after latch 603 is engaged, display unit 600 remains tiltable and therefore adjustable in viewing angle, because support arm 604 is mounted through friction hinges to base unit 610.

The foregoing description and drawings merely explain and illustrate the invention and the invention is not limited thereto, inasmuch as those skilled in the art, having the present disclosure before them will be able to make modifications and variations therein without departing from the scope of the invention.

What is claimed is:

1. A portable computer system comprising:
    a base unit;
    an engagement tab comprising electrical contacts, the engagement tab being supported by one or more frictional hinges that are attached to the base unit, the hinges aligned to permit rotation of the tab about a predetermined axis through the application of at least a threshold level of torque to the tab;
    a detachable display unit, the display unit comprising a display panel contained in a unitary display housing in a predetermined position with respect to said housing;
    a first receptacle proximate a first side of the display unit adapted to removably engage the engagement tab to mechanically secure the base unit to the display unit in a predetermined spatial relationship thereto, when the display unit is positioned in a first orientation with respect to the base unit;
    the first receptable comprising electrical contacts positioned for interconnection with the engagement tab electrical contacts when the engagement tab is engaged with the first receptacle;
    a second receptacle proximate a second side of the display unit adapted to removably engage the engagement tab to mechanically secure the base unit to the display unit in a predetermined spatial relationship thereto, when the display unit is positioned in a second orientation with respect to the base unit; and
    the second receptacle comprising electrical contacts positioned for interconnection with the engagement tab electrical contacts when the engagement tab is engaged with the second receptacle.

2. The portable computer of claim 1, in which:
    the first receptacle is located on a first side of the display unit;
    the second receptacle is located on a second side of the display unit, where the second side is adjacent to the first side;
    the first orientation is a landscape orientation; and
    the second orientation is a portrait orientation;
    whereby the display unit can be utilized with the base unit to display information in either a landscape or a portrait orientation.

3. The portable computer of claim 1, in which the engagement tab comprises:
    a support shaft rotatably mounted to the base unit by the one or more frictional hinges; and
    a tab member sized for insertion alternately into the first receptacle and the second receptacle.

4. The portable computer of claim 3, in which the cross-sectional shape of the tab member corresponds to the cross-sectional shape of the first and second receptacles, whereby the engagement tab provides physical support for the display unit when engaged with either of the first or second receptacles.

5. The portable computer of claim 1, in which the display unit further comprises one or more latches to secure the display unit to the base unit.

6. The portable computer of claim 1, in which the base unit further comprises one or more latches to secure the display unit to the base unit.

7. The portable computer of claim 1, said detachable display unit further comprising:
    a plurality of electrical conductors, said conductors including a first conductive pathway from the first receptacle to the display panel, and a second conductive pathway from the second receptacle to the display panel;
    whereby the display unit can convey video information signals from either of the first or second receptacles, to the display panel.

8. The portable computer of claim 7, further comprising:
    means for completing the second conductive pathway when the display unit is attached to the base unit via the second receptacle, and disrupting the second conductive pathway when the display unit is attached to the base unit via the first receptacle.

9. The portable computer of claim 7, said portable computer further comprising:
    a slidable finger element mounted within the display unit, the finger element being spring-biased so that an outer end of the finger element normally extends from the outer surface of the second side of the display unit;
    a contact location on the base unit, said contact location contacting the outer end of the slidable finger when the display unit is attached to the base unit by engagement of the second receptacle with the engagement tab; and
    a switch positioned within the second conductive pathway, the switch being linked to the slidable finger element and normally open, said switch being closed when the slidable finger contacts the base unit contact location.

10. The portable computer system of claim 1, in which:
    the engagement tab comprises a plurality of engagement tab portions, each being supported by one or more frictional hinges that are attached to the base unit, the hinges aligned to permit rotation of each engagement tab portion about a predetermined axis through the application of at least a threshold level of torque to said engagement tab portions;

the first receptacle comprises a plurality of receptacle portions, each of which is adapted to removably engage one of the plurality of engagement tab portions; and the second receptacle comprises a plurality of receptacle portions, each of which is adapted to removably engage one of the plurality of engagement tab portions.

11. A portable computer system comprising:

a base unit;

a detachable display unit, the display unit comprising a display panel contained in a unitary display housing in a predetermined position with respect to said housing;

a receptacle in the base unit comprising electrical contacts;

a first engagement tab supported by one or more frictional hinges that are attached to the display unit proximate a first side of said display unit, the hinges aligned to permit rotation of the tab about a predetermined axis through the application of at least a threshold level of torque to the tab, the first engagement tab being adapted to removably engage the receptacle to mechanically secure the display unit to the base unit in a predetermined spatial relationship thereto, when the display unit is positioned in a first orientation with respect to the base unit;

a second engagement tab supported by one or more frictional hinges that are attached to the display unit proximate a second side of said display unit, the hinges aligned to permit rotation of the tab about a predetermined axis through the application of at least a threshold level of torque to the tab, the second engagement tab being adapted to removably engage the receptacle to mechanically secure the display unit to the base unit in a predetermined spatial relationship thereto, when the display unit is positioned in a second orientation with respect to the base unit;

the first engagement tab comprising electrical contacts positioned for interconnection with the receptacle electrical contacts when the first engagement tab is engaged with the receptacle;

the second engagement tab comprising electrical contacts positioned for interconnection with the receptacle electrical contacts when the second engagement tab is engaged with the receptacle.

12. The portable computer system of claim 11, in which:

the first engagement tab is located on a first side of the display unit;

the second engagement tab is located on a second side of the display unit, where the second side is adjacent to the first side;

the first orientation is a landscape orientation; and the second orientation is a portrait orientation;

whereby the display unit can be utilized with the base unit to display information in either a landscape or a portrait orientation.

13. The portable computer system of claim 11, in which the cross-sectional shape of the receptacle corresponds to the cross-sectional shape of the first and second engagement tabs, whereby the first and second engagement tabs provide physical support for the display unit when engaged with the receptacle.

14. The portable computer of claim 11, said detachable display unit further comprising:

a plurality of electrical conductors, said conductors including a first conductive pathway from the first engagement tab to the display panel, and a second conductive pathway from the second engagement tab to the display panel;

whereby the display unit can convey video information signals from either of the first or second engagement tabs, to the display panel.

15. The portable computer of claim 14, further comprising:

means for completing the second conductive pathway when the display unit is attached to the base unit via the second engagement tab, and disrupting the second conductive pathway when the display unit is attached to the base unit via the first engagement tab.

16. The portable computer of claim 14, said portable computer further comprising:

a slidable finger element mounted within the display unit, the finger element being spring-biased so that an outer end of the finger element normally extends from the outer surface of the second side of the display unit;

a contact location on the base unit, said contact location contacting the outer end of the slidable finger when the display unit is attached to the base unit by engagement of the second engagement tab with the receptacle; and a switch positioned within the second conductive pathway, the switch being linked to the slidable finger element and normally open, said switch being closed when the slidable finger contacts the base unit contact location.

17. The portable computer system of claim 11, in which:

the first engagement tab comprises a plurality of first engagement tab portions, each being supported by one or more frictional hinges that are attached to the display unit, the hinges aligned to permit rotation of each first engagement tab portion about a predetermined axis through the application of at least a threshold level of torque to said first engagement tab portions;

the second engagement tab comprises a plurality of second engagement tab portions, each being supported by one or more frictional hinges that are attached to the display unit, the hinges aligned to permit rotation of each second engagement tab portion about a predetermined axis through the application of at least a threshold level of torque to said first engagement tab portions;

the receptacle comprises a plurality of receptacle portions, each of which is adapted to removably engage one of the plurality of first engagement tab portions, and one of the plurality of second engagement tab portions.

18. A portable computer system comprising:

a base unit;

a detachable display unit comprising a display panel contained in a unitary display housing in a predetermined position with respect to said housing;

one or more frictional hinges mounted to the base unit which tiltably support the detachable display unit in a predetermined spatial relationship thereto;

a first set of display electrical contacts positioned on a first side of the display unit;

a second set of display electrical contacts positioned on a second side of the display unit;

a cylindrical connector attached to the base unit and having a plurality of base electrical contacts extending around at least a portion of the circumference of the cylindrical connector;

said base electrical contacts positioned for contact with the first set of display electrical contacts when the display unit is attached to the base unit in a first orientation, and positioned for contact with the second set of display electrical contacts when the display unit is attached to the base unit in a second orientation.

19. A portable computer comprising:

a base unit having a keyboard and a base connector;

a detachable display unit comprising a display panel contained in a unitary display housing in a predetermined position with respect to said housing;

said display unit further comprising a first display connector for removable engagement with the base connector to mechanically secure the base unit to the display unit in a predetermined spatial relationship thereto;

wherein the engagement of the base connector with the display connector provides physical support for the display unit;

the base unit further comprising an integrated display panel;

whereby the integrated display panel provides a display output for the base unit when the detachable display unit is detached from the base unit.

20. The portable computer of claim 19, wherein:

the first display connector is positioned along a first side of the display unit to removably connect the base unit with the display unit when the display unit is positioned in a first orientation with respect to the base unit; and the display unit further comprises a second display connector positioned along a second side of the display unit to removably connect the base unit with the display unit when the display unit is positioned in a second orientation with respect to the base unit.

\* \* \* \* \*